United States Patent
Kawai et al.

(10) Patent No.: US 10,655,632 B2
(45) Date of Patent: May 19, 2020

(54) SHAFT SEAL DEVICE AND VERTICAL PUMP WITH THIS SHAFT SEAL DEVICE

(71) Applicant: EBARA CORPORATION, Tokyo (JP)

(72) Inventors: Yasushi Kawai, Tokyo (JP); Kazuya Hirata, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 180 days.

(21) Appl. No.: 15/748,225

(22) PCT Filed: Aug. 5, 2016

(86) PCT No.: PCT/JP2016/073100
§ 371 (c)(1),
(2) Date: Jan. 29, 2018

(87) PCT Pub. No.: WO2017/022851
PCT Pub. Date: Feb. 9, 2017

(65) Prior Publication Data
US 2018/0216625 A1  Aug. 2, 2018

(30) Foreign Application Priority Data
Aug. 6, 2015 (JP) .................... 2015-156100

(51) Int. Cl.
*F04D 29/12* (2006.01)
*F04D 13/08* (2006.01)
(Continued)

(52) U.S. Cl.
CPC ........... *F04D 29/128* (2013.01); *F04D 13/08* (2013.01); *F04D 29/106* (2013.01);
(Continued)

(58) Field of Classification Search
CPC ...... F04D 29/128; F04D 29/10; F04D 29/106; F16J 15/4476; F16J 15/164; F05B 2240/57; F05B 2260/603
See application file for complete search history.

(56) References Cited

U.S. PATENT DOCUMENTS 3,039,778 A * 6/1962 Sence .................. F01D 11/003
   277/422
3,554,661 A * 1/1971 Oglesby et al. ........ F04D 5/002
   415/112
(Continued)

FOREIGN PATENT DOCUMENTS

CN   102362109 A   2/2012
CN   102678580 A   9/2012
(Continued)

OTHER PUBLICATIONS

Office action issued in Chinese Patent Application No. 201680044861.7 dated Feb. 2, 2019.
(Continued)

*Primary Examiner* — Eugene G Byrd
(74) *Attorney, Agent, or Firm* — Pearne & Gordon LLP

(57) ABSTRACT

A shaft seal device is fixed to a container that separates a high-pressure fluid and a low-pressure fluid from each other, and seals a shaft-penetrated portion of the container through which a rotational shaft extends. This shaft seal device includes: a seal casing having a through-hole through which the rotational shaft extends, the seal casing having a seal chamber which communicates with the through-hole and into which the high-pressure fluid flows; and a disk-shaped seal body which is housed in the seal chamber, the seal body being rotatable together with the rotational shaft and having an annular surface perpendicular to an axis of the rotational shaft. An inner surface of the seal casing, which faces the (Continued)

annular surface of the seal body and defines the seal chamber, is a flat surface perpendicular to the axis of the rotational shaft.

9 Claims, 12 Drawing Sheets

(51) Int. Cl.
    *F16J 15/16*     (2006.01)
    *F04D 29/10*     (2006.01)
    *F16J 15/447*     (2006.01)
    *F04D 13/02*     (2006.01)
    *F16J 15/44*     (2006.01)

(52) U.S. Cl.
    CPC .......... *F04D 29/108* (2013.01); *F16J 15/164* (2013.01); *F16J 15/4476* (2013.01); *F04D 13/02* (2013.01); *F05B 2240/57* (2013.01); *F05B 2260/603* (2013.01); *F05D 2260/6022* (2013.01); *F16J 15/442* (2013.01)

(56) References Cited

U.S. PATENT DOCUMENTS

| | | | | |
|---|---|---|---|---|
| 4,718,820 | A * | 1/1988 | Jaques | F04D 29/0462 |
| | | | | 277/583 |
| 2004/0136826 | A1* | 7/2004 | Britt | F01D 1/02 |
| | | | | 415/206 |
| 2005/0087935 | A1* | 4/2005 | Hughes | F04D 29/106 |
| | | | | 277/610 |
| 2006/0198743 | A1* | 9/2006 | Taga | F04D 29/108 |
| | | | | 417/423.1 |
| 2008/0044274 | A1* | 2/2008 | Visintainer | F04D 29/049 |
| | | | | 415/112 |
| 2009/0116960 | A1* | 5/2009 | Lehtonen | F04D 29/146 |
| | | | | 415/231 |
| 2010/0166582 | A1* | 7/2010 | Racicot | F04B 39/041 |
| | | | | 417/437 |
| 2011/0138963 | A1* | 6/2011 | Pischel | F16J 15/164 |
| | | | | 74/640 |
| 2017/0002838 | A1* | 1/2017 | Russalian | F04D 29/106 |
| 2019/0107116 | A1* | 4/2019 | Chilcoat | F04D 13/06 |

FOREIGN PATENT DOCUMENTS

| | | | | |
|---|---|---|---|---|
| EP | | 3141759 A1 * | 3/2017 | ............. F16J 15/44 |
| JP | | S59-37369 A | 2/1984 | |
| JP | | H01-93397 U | 6/1989 | |
| JP | | H01-252377 A | 10/1989 | |
| JP | | H02-13200 U | 1/1990 | |
| JP | | 04316766 A * | 11/1992 | ......... F04D 29/106 |
| JP | | H07-133797 A | 5/1995 | |
| JP | | 2001-241555 A | 9/2001 | |
| JP | | 2006322455 A * | 11/2006 | ......... F04D 29/106 |

OTHER PUBLICATIONS

International Search Report issued in Patent Application No. PCT/JP2016/073100 dated Oct. 25, 2016.

Written Opinion issued in Patent Application No. PCT/JP2016/073100 dated Oct. 25, 2016.

* cited by examiner

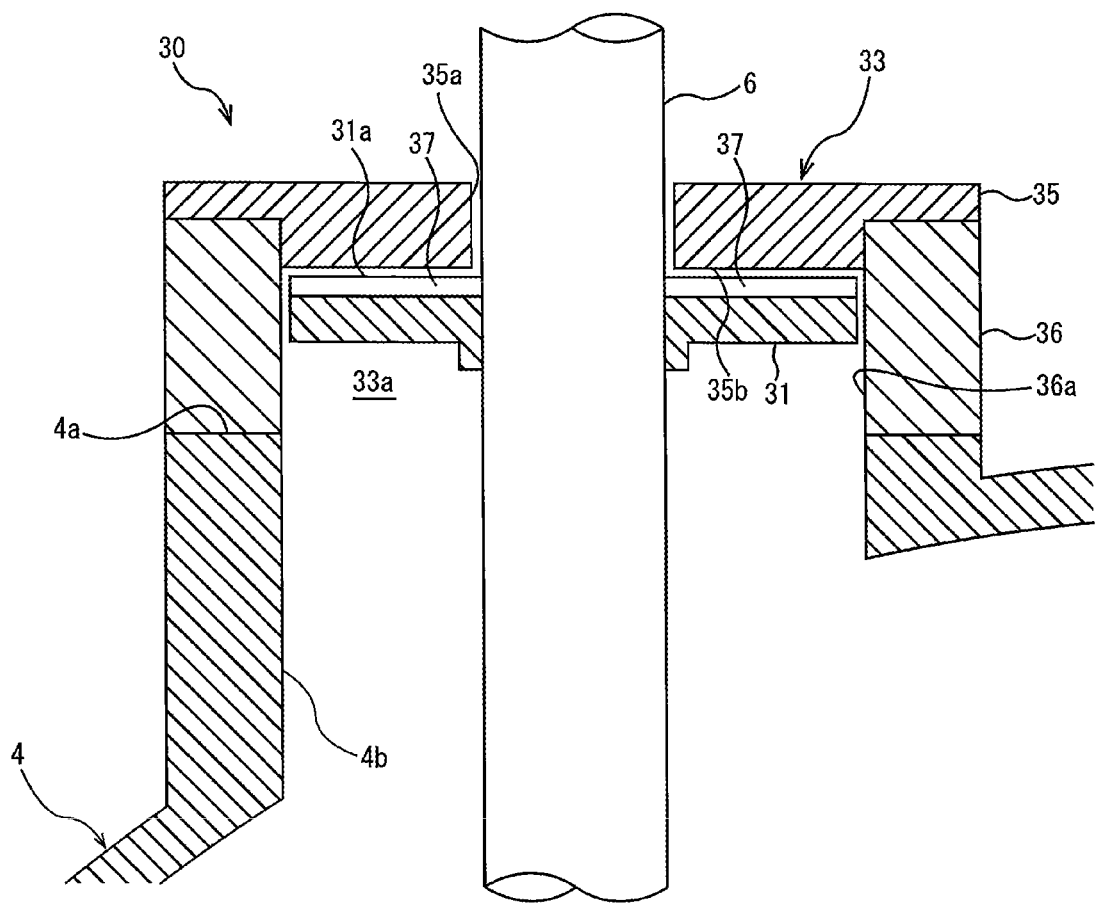

PRESSURE P1 OF LIQUID IN TANK

PRESSURE P2 OF LIQUID IN TANK

SHAFT SEAL DEVICE AND VERTICAL PUMP WITH THIS SHAFT SEAL DEVICE

TECHNICAL FIELD

The present invention relates to a shaft seal device that prevents a liquid from leaking out of a shaft-penetrating portion of a container through which a rotational shaft extends. The present invention further relates to a vertical pump including this shaft seal device.

BACKGROUND ART

Generally, there is known a shaft seal device to be fixed to a container that separates a high-pressure fluid and a low-pressure fluid from each other and sealing a shaft-penetrating portion of the container through which a rotational shaft extends. For example, a rotational shaft, which rotates the impeller of a vertical pump, extends through a pump casing, and a shaft-penetrating portion, through which the rotational shaft extends, is sealed by a shaft seal device so as to prevent a liquid from leaking out of the shaft-penetrating portion. In terms of the vertical pump, the container is the pump casing, the high-pressure fluid is a liquid flowing within the pump casing, and the low-pressure fluid is atmosphere outside of the pump casing. Such a shaft seal device typically incorporates a seal mechanism such as a gland packing seal, a mechanical seal, or a floating seal.

A gland packing seal is brought into contact with an outer circumferential surface of a rotational shaft to prevent a liquid leakage by contact pressure between them. A mechanical seal has a rotating ring rotatable together with a rotational shaft and a stationary ring fixed to a stationary member, such as a housing. The rotating ring and the stationary ring are kept in contact with each other, preventing a liquid leakage. A floating seal has a sleeve fixed to an outer circumferential surface of a rotational shaft, and a seal ring facing the sleeve. An extremely small gap is formed between the seal ring and the sleeve, allowing only a minute amount of liquid to leak therethrough.

SUMMARY OF INVENTION

Technical Problem

Since the gland packing seal is in contact with the rotating rotational shaft at all times (this contact state is referred to as "sliding contact"), the gland packing seal wears gradually. Therefore, the gland packing seal needs to be maintained or replaced periodically. Furthermore, it is necessary to cool the gland packing seal because frictional heat is generated in accordance with sliding contact between the gland packing seal and the rotational shaft. If a liquid to be handled is fresh water, the gland packing seal can be cooled by that liquid. However, if the liquid is a slurry or the like in which solid substances are contained, then in order to prevent the solid substances from becoming caught between the gland packing seal and the rotational shaft, it is necessary to supply a clean liquid to the grand packing seal from a water injection system separately provided, or to surround the rotational shaft with a protective tube for preventing the solid substances from entering.

The rotating ring of the mechanical seal is brought into sliding contact with the stationary ring at all times, so that the rotating ring and the stationary ring wear gradually. Therefore, the rotating ring and the stationary ring need to be maintained or replaced periodically. Furthermore, the mechanical seal requires an ancillary facility for pouring a flushing liquid for cooling, because frictional heat is generated in accordance with sliding contact between the rotating ring and the stationary ring. Moreover, since contacting surfaces of the rotating ring and the stationary ring are machined to a precision finish, an accurate assembly of the rotating ring and the stationary ring is required when the rotating ring and the stationary ring are maintained or replaced.

Unlike the gland packing seal and the mechanical seal which have sliding-contact members, the floating seal is considered as a non-contact shaft seal device that has no sliding-contact member, because a small gap is formed between the seal ring and the sleeve. Consequently, the maintenance that is required for the gland packing seal and the mechanical seal is not necessary in principle. However, when the rotational shaft whirls or vibrates, the seal ring may be brought into contact with the sleeve. In order to allow such contact, the seal ring and/or the sleeve need to be made of a high hardness material that has highly wear resistant. As a result, the floating seal tends to be expensive. In addition, since the floating seal allows the liquid to pass therethrough to a certain extent, it is not unsuitable for the prevention of leakage of a liquid containing solid substances, such as a slurry. Further, if a liquid to be handled is seawater, the corrosive effect of liquid often precludes the use of high hardness material in the floating seal.

The present invention has been made in view of the above drawbacks. It is therefore an object of the present invention to provide a shaft seal device in which the frequency of maintenance is greatly reduced, there is no need for an ancillary facility for supplying a liquid such as cooling water, and it is not necessary to machine its components for a special finish. it is also an object of the present invention to provide a vertical pump including this shaft seal device.

Solution to Problem

In order to achieve the above object, according to one aspect of the present invention, there is provided a shaft seal device to be fixed to a container that separates a high-pressure fluid and a low-pressure fluid from each other and sealing a shaft-penetrated portion of the container through which a rotational shaft extends, including: a seal casing having a through-hole through which the rotational shaft extends, the seal casing having a seal chamber which communicates with the through-hole and into which the high-pressure fluid flows; and a disk-shaped seal body which is housed in the seal chamber, the seal body being rotatable together with the rotational shaft and having an annular surface perpendicular to an axis of the rotational shaft; wherein an inner surface of the seal casing, which faces the annular surface of the seal body and defines the seal chamber, is a flat surface perpendicular to the axis of the rotational shaft.

In a preferred aspect of the present invention, the annular surface of the seal body has a plurality of radially-extending grooves formed therein, and each of the grooves has a width which is constant from an inner end to an outer end of the groove.

In a preferred aspect of the present invention, the annular surface of the seal body has a plurality of radially-extending grooves formed therein, and each of the grooves has a width which gradually increases toward an outer end of the groove.

In a preferred aspect of the present invention, the shaft seal device further includes a non-contact type upper seat structure which. Seals a gap between the rotational shaft and the through-hole, the upper seal structure being disposed above the seal body.

In a preferred aspect of the present invention, the upper seal structure is a labyrinth seal or a flat seal; a leakage liquid cover is fixed to an upper portion of the seal casing so as to surround the upper seal structure; the leakage liquid cover has an opening which provides a fluid communication between an inner space of the leakage liquid cover and an exterior of the leakage liquid cover; and a leakage liquid pipe is coupled to the opening.

In a preferred aspect of the present invention, the shaft seal device further includes a non-contact type lower seal structure which seals a gap between the rotational shaft and the through-hole of the seal casing, the lower seal structure being disposed below the seal body; wherein the lower seal structure is a labyrinth seal or a flat seal; the tower seal structure has at least one opening which provides a fluid communication between the seal chamber and an exterior of the seal casing; and a drain pipe is coupled to the opening.

According another aspect of the present invention, there is provided a shaft seal device to be fixed to a container that separates a high-pressure fluid and a low-pressure fluid from each other, and sealing a shaft-penetrated portion of the container through which a rotational shaft extends, including: a seat casing having a through-hole through which the rotational shaft extends, the seal casing having a seal chamber which communicates with the through-hole and into which the high-pressure fluid flows; and a disk-shaped seal body which is housed in the seal chamber and is rotatable together with the rotational shaft; wherein the seal body has an upper surface inclined downwardly with respect to a plane perpendicular to an axis of the rotational shaft; and an inner surface of the seal casing, which faces the upper surface of the seal body and defines the seal chamber, extends along the upper surface of the seal body.

In a preferred aspect of the present invention, the upper surface of the seal body is curved.

According to still another aspect of the present invention, there is provided a vertical pump including: an impeller; a rotational shaft to which the impeller is fixed; a pump casing housing the impeller therein and having a shaft-penetrated portion through which the rotational shaft extends; and a shaft seal device for sealing the shaft penetrated portion; wherein the shaft seal device includes: a seal casing having a through-hole through which the rotational shaft extends, the seal casing having a seal chamber which communicates with the through-hole; and a disk-shaped seal body which is housed in the seal chamber, the seal body being rotatable together with the rotational shaft and having an annular surface perpendicular to an axis of the rotational shaft; wherein an inner surface of the seal casing, which faces the annular surface of the seal body and defines the seal chamber, is a flat surface perpendicular to the axis of the rotational shaft.

According to still another aspect of the present invention, there is provided a vertical pump including: an impeller; a rotational shaft to which the impeller is fixed; a pump casing housing the impeller therein and having a shaft-penetrated portion through which the rotational shaft extends; and a shaft seal device for sealing the shaft-penetrated portion; wherein the shaft seal device includes; a seal casing having a through-hole through which the rotational shaft extends, the seal casing having a seal chamber which communicates with the through-hole; and a disk-shaped scat body which is housed in the seal chamber and is rotatable together with the rotational shaft; wherein the seal body has an upper surface inclined downwardly with respect to a plane perpendicular to an axis of the rotational shaft; and an inner surface of the seal casing, which face the annular surface of the seal body and defines the seal chamber, extends along the upper surface of the seal body.

Advantages of the Invention

The shaft seal device according to the present invention is a non-contact shaft seal device in which the seal body is not brought into sliding contact with other members, so that the seal body does not wear. Therefore, the frequency of maintenance of the shaft seal device can be greatly reduced. Furthermore, since the seal body performs a sealing function in a non-contact manner, frictional heat generated in a liquid flowing on the seal body is extremely small compared with shaft seal devices including components which are brought into sliding contact with each other, and therefore it is not necessary to separately provide an ancillary facility for supplying a liquid, such as cooling water or a flushing liquid, into the shaft seal device. Further, an accurate assembly of components as required in the mechanical seal is not required, because surfaces of components, such as the rotating ring and the stationary ring, do not need to be machined to precision finish.

BRIEF DESCRIPTION OF DRAWINGS

FIG. 2 is a cross-sectional view of the shaft seal device shown in FIG. 1;

DESCRIPTION OF EMBODIMENTS

Embodiments of the present invention will be described below with reference to the drawings.

Figure 1:
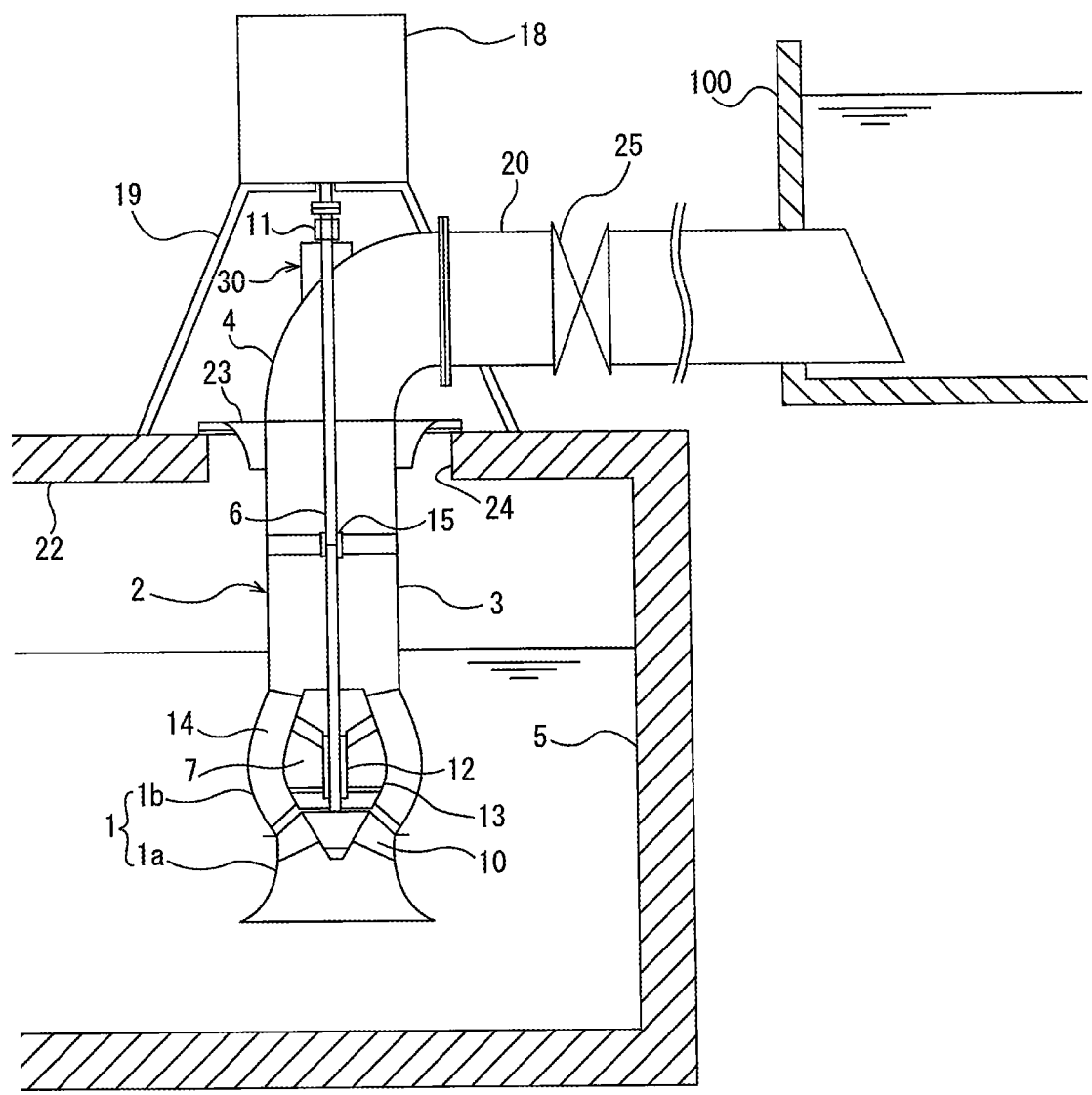
FIG. 1 is a schematic view showing a vertical pump that is provided with a shaft seal device according to an embodiment of the present invention.

FIG. 1 is a schematic view showing a vertical pump that is provided with a shaft seal device 30 according to an embodiment of the present invention. As shown in FIG. 1, the vertical pump includes an impeller casing 1 having a suction bell-mouth 1a and a discharge bowl 1b, a column pipe 3 by which the impeller casing 1 is suspended in a suction sump 5, a discharge elbow 4 connected to the upper end of the column pipe 3, an impeller 10 housed in the impeller casing 1, and a rotational shaft 6 to which the impeller 10 is fixed. The column pipe 3 extends downwardly through an insertion opening 24 which is formed in a pump installation floor 22 disposed in an upper part of the suction sump 5, and is fixed to the pump installation floor 22 by an installation base 23 mounted on the upper end of the column pipe 3. The rotational shaft 6 extends vertically through the discharge elbow 4, the column pipe 3, and the impeller casing 1. A pump casing 2 is constituted of the impeller casing 1, the column pipe 3, and the discharge elbow 4.

The suction bell-mouth 1a is open downwardly and has an upper end connected to the lower end of the discharge bowl 1b. The impeller 10 is fixed to the lower end of the rotational shaft 6, and the impeller 10 is rotatable together with the rotational shaft 6. A plurality of guide vanes 14 are disposed above (i.e., on a discharge side of) the impeller 10. These guide vanes 14 are fixed to an inner circumferential surface of the discharge bowl 1b. The rotational shaft 6 is rotatably supported by an outer bearing 11, an intermediate bearing 15, and a submerged bearing 12. The submerged bearing 12 is housed in the discharged bowl 1b and disposed above the impeller 10. Support members 7 for supporting the submerged bearing 12 are fixed to an inner surface of a bowl bushing 13, and the bowl bushing 13 is supported on the impeller casing 1 by guide vanes 14. The outer bearing 11 is a roller bearing such as a ball bearing, or a slide bearing. The submerged bearing 12 and the intermediate bearing 15 are a slide hearing, respectively.

The rotational shaft 6 extends upwardly through the discharge elbow 4, and is coupled to a drive source 18. The drive source 18 is fixed to a mount base 19 that is fixed to the pump installation floor 22. When the vertical pump is in operation, the impeller 10 is positioned below the liquid level in the suction sump 5.

The vertical pump delivers the liquid in the suction sump 5 to a discharge sump 100. Specifically, when the drive source 18 is actuated to thereby rotate the impeller 10 through the rotational shaft 6, the liquid in the suction sump 5 is sucked from the suction bell-mouth 1a, and delivered through the discharge bowl 1b, the column pipe 3, the discharge elbow 4, and a discharge pipe 20 into the discharge sump 100. The discharge pipe 20 extends from the discharge elbow 4 to the discharge sump 100. The liquid level in the discharge sump 100 is located at a higher position than the discharge elbow 4. A gate valve 25 is disposed in the middle of the discharge pipe 20, and this gate valve 25 is opened during a normal operation of the vertical pump. When operating of the vertical pump is stopped, the gate valve 25 is closed, thereby preventing the liquid from flowing back from the discharge sump 100 through the discharge pipe 20 to the suction sump 5. A check valve may be provided in place of the gate valve 25. Further, a flap valve may be disposed on an outlet end of the discharge pipe 20.

As shown in FIG. 1, the shaft seal device 30 according to the embodiment of the present invention is disposed in a shaft-penetrating portion of the discharge elbow 4 of the pump casing 2 through which the rotational shaft 6 extends. This shaft seal device 30 prevents the liquid from leaking out of the vertical pump. The shaft seal device 30 will be described below with reference to FIG. 2.

The shaft seal device 30 can be applied to machines other than the vertical pump, as long as it is fixed to a container which separates a lower-pressure fluid and an upper low-pressure fluid from each other and seals a shaft-penetrated portion of the container through which a rotational shaft extends. In terms of the vertical pump, the container is the pump casing 2, the high-pressure fluid is the liquid flowing within the pump casing 2, and the low-pressure fluid is atmosphere outside of the pump casing 2.

FIG. 2 is a cross-sectional view of the shaft seal device 30 according to the embodiment of the present invention. As shown in FIG. 2, the shaft seal device 30 is fixedly mounted on a shaft-seal-device mounting surface 4a of the discharge elbow 4 so as to close a through-hole 4b formed in the discharge elbow 4. The rotational shaft 6 extends vertically through the through-hole 4b. The shaft seal device 30 includes a disk-shaped seal body 31 fixed to the rotational shaft 6, and a seal casing 33 having a seal chamber 33a formed therein, which houses the seal body 31. The rotational shaft 6 and an inner circumferential, surface of the seal body 31 (i.e., a through-hole 31b shown in FIGS. 3A and 3B to be described later) are in intimate contact with each other, so that the liquid cannot pass between the rotational shaft 6 and the inner circumferential surface of the seal body 31. Although not shown, a gap between the rotational shaft 6 and the inner circumferential surface of the seal body 31 may be sealed by a seal member, such as an O-ring. The seal body 31 has its center aligned with an axis of the rotational shaft 6, and the seal body 31 is rotatable together with the rotational shaft 6.

The seal casing 33 has an upper casing 35 having a through-hole 35a through which the rotational shaft 6 extends, and an intermediate casing 36 that supports the upper casing 35 thereon. A center line of the through-hole 35a is aligned with the axis of the rotational shaft 6. The intermediate casing 36 has a cylindrical inner circumferential surface 36a. A center line of this inner circumferential surface 36a is aligned with the axis of the rotational shalt 6 and the center of the seal body 31. The intermediate casing 36 is sandwiched between the shaft-seal-device mounting surface 4a of the discharge elbow 4 and the upper casing 35, and fixed to the upper casing 35 and the shaft-seal-device mounting surface 4a. Thus, the seal chamber 33a, which houses the seal body 31, is formed in the seal casing 33.

The through-hole 4b, which is formed in the discharge elbow 4, is formed along the inner circumferential surface 36a of the intermediate casing 36. Specifically, the through-hole 4b has the same shape and about the same size as the inner circumferential surface 36a of the intermediate casing 36, and is connected to the inner circumferential surface 36a. The seal chamber 33a of the seal casing 33 is open downwardly, and communicates with an inside of the discharge elbow 4 through the through-hole 4b formed in the discharge elbow 4.

The seal chamber 33a is formed in the seal casing 33. More specifically, the seal chamber 33a is defined by a lower surface 35b of the upper casing 35 and the inner circumferential surface 36a of the intermediate casing 36. The seal body 31 is fixed to the rotational shaft 6 in the seal chamber 33a. The lower surface 35b of the upper casing 35 is a flat surface perpendicular to the axis of the rotational shaft 6. The inner circumferential surface 36*a* of the intermediate casing 36 is concentric to an outer circumferential surface of the rotational shaft 6. The seal chamber 33*a* communicates with the through-hole 35*a*, and is positioned below the through-hole 35*a*. The rotational shaft 6 extends vertically through the seal chamber 33*a* and the through-hole 35*a*.

The seal body 31 has an upper surface 31*a* which is an annular surface perpendicularly to the axis of the rotational shaft 6. This upper surface 31*a* is configured as a surface capable of applying suitable centrifugal forces to the liquid flowing on the upper surface 31*a* by rotation of the seal body 31. For example, the upper surface 31*a* has a plurality of radially-extending grooves 37 formed therein. The upper surface 31*a* of the seal body 31 faces the lower surface 35*b* of the upper casing 35, which is one of the inner surfaces defining the seal chamber 33*a*, across a gap.

The gap between the upper surface 31*a* of the seal body 31 and the lower surface 35*b* of the upper casing 35 is designed in consideration of the rotational speed of the seal body 31, the diameter of the seal body 31, and the dynamic viscosity of liquid such that a necessary and sufficient centrifugal force field is produced in the gap by the rotation of the seal body 31.

Figure 3A:
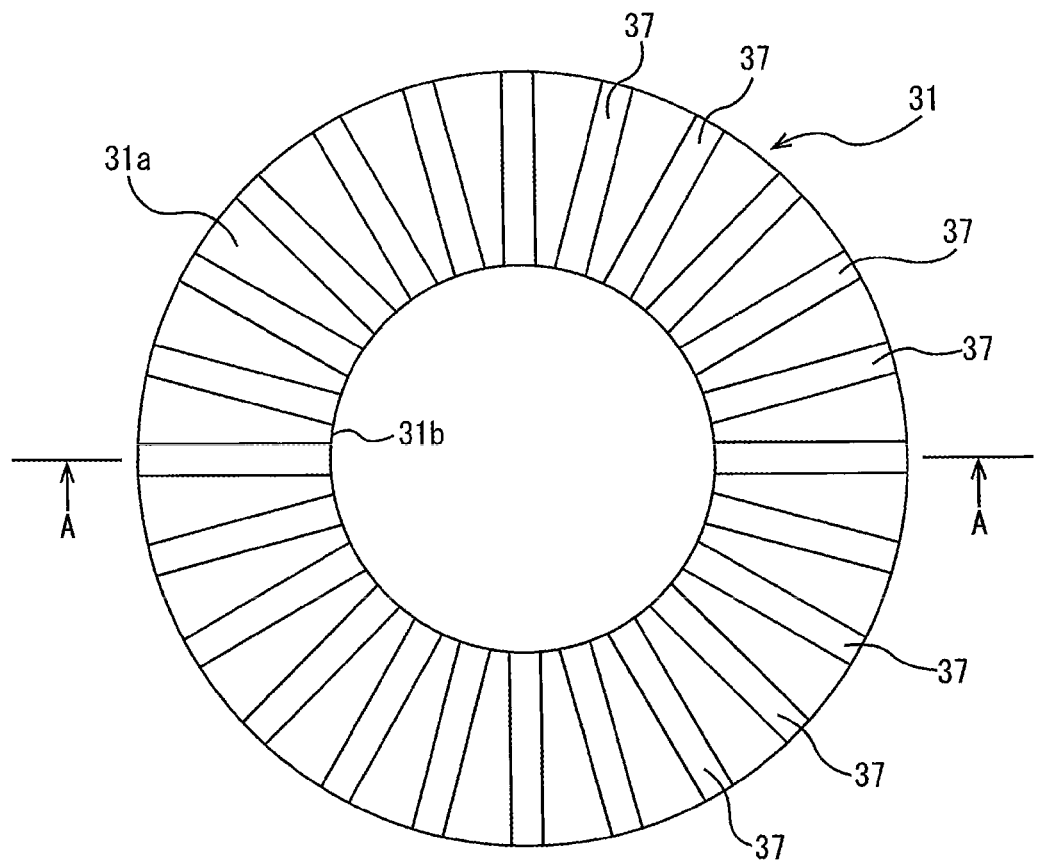
FIG. 3A is a plan view showing an embodiment of a seal body.
Figure 3B:
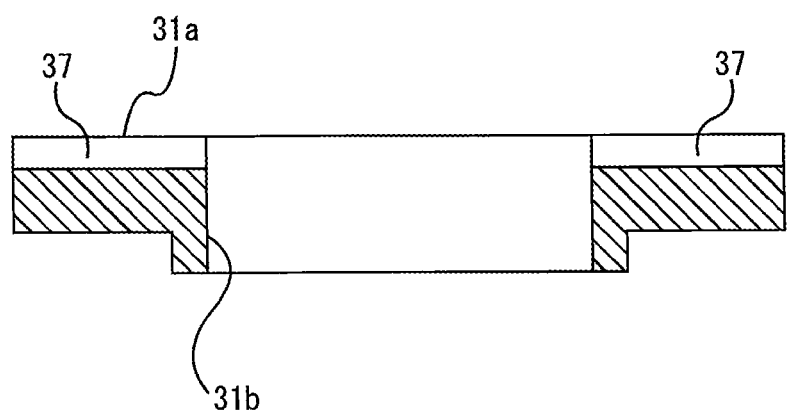
FIG. 3B is a cross-sectional view taken alone line A-A of FIG. 3A.

FIG. 3A is a plan view showing an embodiment of the seal body 31, and FIG. 3B is a cross-sectional view taken alone line A-A of FIG. 3A. As shown in FIGS. 3A and 3B, the seal body 31 has a through-hole 31*b* formed centrally therein, through which the rotational shaft 6 is inserted. The upper surface 31*a* of the seal body 31 has a plurality of grooves 37 formed therein, the grooves 37 radially extending from an inner circumferential surface of the seal body 31 (i.e., the through-hole 31*b*) to an outer circumferential surface of the seal body 31. In the embodiment shown in FIG. 3A, 24 grooves 37 are formed. However, the number of grooves 37 may be greater or smaller than 24. In the embodiment shown in FIGS. 3A and 3B. the grooves 37 extend linearly, and each of the grooves 37 has a width which is constant from an inner end to an outer end thereof. Needless to say, since the upper surface 31*a* of the seal body 31 has the purpose of applying centrifugal forces to the liquid flowing on the upper surface 31*a*, the grooves 37 may be inclined to a radial direction of the seal body 31, or may not extend linearly. Furthermore, the width of each of the grooves 37 may not be the constant.

Part of the liquid flowing in the discharge elbow 4 (see FIG. 1) toward the discharge pipe 20 flows through the through-hole 4*b* into the seal chamber 33*a* of the seal casing 33. Further, the liquid tends to flow through the grooves 37*a* formed in the upper surface 31*a* of the seal body 31 and the gap between the upper surface 31*a* of the seal body 31 and the lower surface 35*b* of the upper casing 35, toward the center of the seal body 31 (i.e., toward the rotational shall 6) in a radial direction of the seal body 31. However, the action of the grooves 37 of the rotating seal body 31 gives a circumferential velocity component to the liquid, so that centrifugal forces are generated in the liquid on the upper surface 31*a* of the seal body 31 and the liquid in the grooves 37. As a result, the liquid on the upper surface 31*a* and the liquid in the grooves 37 are pushed back radially outwardly of the seal body 31. Furthermore, since the gap between the upper surface 31*a* of the seal body 31 and the lower surface 35*b* of the upper casing 35 is of appropriate dimensions, centrifugal forces cart act on the liquid that exists in the gap. As a result, radially outward forces are applied to all of the liquid that exists in the gap between the upper surface 31*a* of the seal body 31 and the lower surface 35*b* of the upper casing 35, and the liquid that exists in the grooves 37.

In this manner, a centrifugal force field is produced in the gap between the seal body 31 and the lower surface 35*b* of the upper casing 35 by the rotation of the seal body 31 having the grooves 37, so that the static pressure of the liquid that exists in this gap increases in a radially outward direction of the upper surface 31*a* of the seal body 31. An equation (1) shown below represents an inertial force (acceleration a) which is generated in a liquid of a unit mass having a circumferential velocity component (angular velocity component) given by the rotation of the seal body 31.

$$a = r\omega^2 \quad (1)$$

where r represents the radius of the seal body 31 and ω represents the angular velocity of the seal body 31.

In order to prevent the liquid from passing through the through-hole 35*a* of the seal casing 35, i.e., to prevent the liquid from leaking out of the seal casing 33, the static pressure of the liquid, which is generated by the rotating seal body 31 in the gap between the upper surface 31*a* of the seal body 31 and the lower surface 35*b* of the upper casing 35, needs to balance with or be greater than the static pressure of the liquid in the seal chamber 33*a*. It is possible to achieve the objects of the present invention by designing the seal body 31 in shapes and dimensions that meet such conditions. The rotational speed of the seal body 31 depends on operating conditions of the pump. Thus, it is possible to accommodate various pumps and operating conditions thereof by designing the radius of the seal body 31 suitably with respect to specifications and operating conditions of the pump, and further forming surface configurations, which allow the liquid to rotate easily with the rotation of the seal body 31, on the upper surface 31*a*.

The upper surface 31*a* of the seal body 31 is configured as a surface capable of applying centrifugal forces to the liquid flowing in the gap between the upper surface 31*a* of the seal body 31 and the lower surface 35*b* of the upper casing 35 by the rotation of the seal body 31. Therefore, in a case where the radius of the seal body 31 and the gap between the upper surface 31*a* of the seal body 31 and the lower surface 35*b* of the upper casing 35 are designed to suitable dimensions depending on various pumps and operating conditions thereof, the upper surface 31*a* of the seal body 31 may be a flat surface without grooves 37.

The rotating seal body 31 causes a circumferential velocity component to be given to the liquid which exists below the seal body 31, so that centrifugal forces act on the liquid that exists in the seal chamber 33*a*, increasing the static pressure of the liquid. if the difference between the static pressure of the liquid that is generated in the gap between the upper surface 31*a* of the seal body 31 and the lower surface 35*b* of the upper casing 35, and the static pressure of the liquid that exists in the seal chamber 33*a* is reduced, the liquid is likely to leak out of the seal casing 33. In this embodiment, since the through-hole 4*b*, which is formed in the discharge elbow 4, is formed along the inner circumferential surface 36*a* of the intermediate casing 36, the seal chamber 33*a* is open into the discharge elbow 4. Consequently, the volume of the liquid that exists below the seal body 31 is regarded as being sufficiently larger than the volume of the gap between the upper surface 31*a* of the seal body 31 and the lower surface 35*b* of the upper easing 35, and thus the circumferential velocity component given to the liquid that exists below the seal body 31 can be sufficiently reduced. As a result, it is possible to assume that the liquid existing in the seal chamber 33a is not affected, or is extremely slightly affected by the rotation of the seal body 31.

The shaft seal device 30 according to this embodiment is a non-contact shalt seal device in which the seal body 31 is not brought into sliding contact with other members, so that the seal body 31 does not wear. Therefore, the frequency of maintenance of the shaft seal device 30 can be greatly reduced. Furthermore, since the seal body 31 performs a sealing function in a non-contact manner, only heat due to fluid shearing forces is generated in the Shaft seal device 30. Therefore, the amount of heat generated in the shall seal device 30 is extremely small compared with shaft seal devices including components which are brought into sliding contact with each other, and thus, it is not necessary to separately provide an ancillary facility for supplying a liquid, such as cooling water or flushing liquid, into the shall seal device. Further, an accurate assembly of components as required in the mechanical seal is not required, because surfaces of components, such as the rotating ring and the stationary ring, do not need to be machined to precision finish.

Figure 4A:
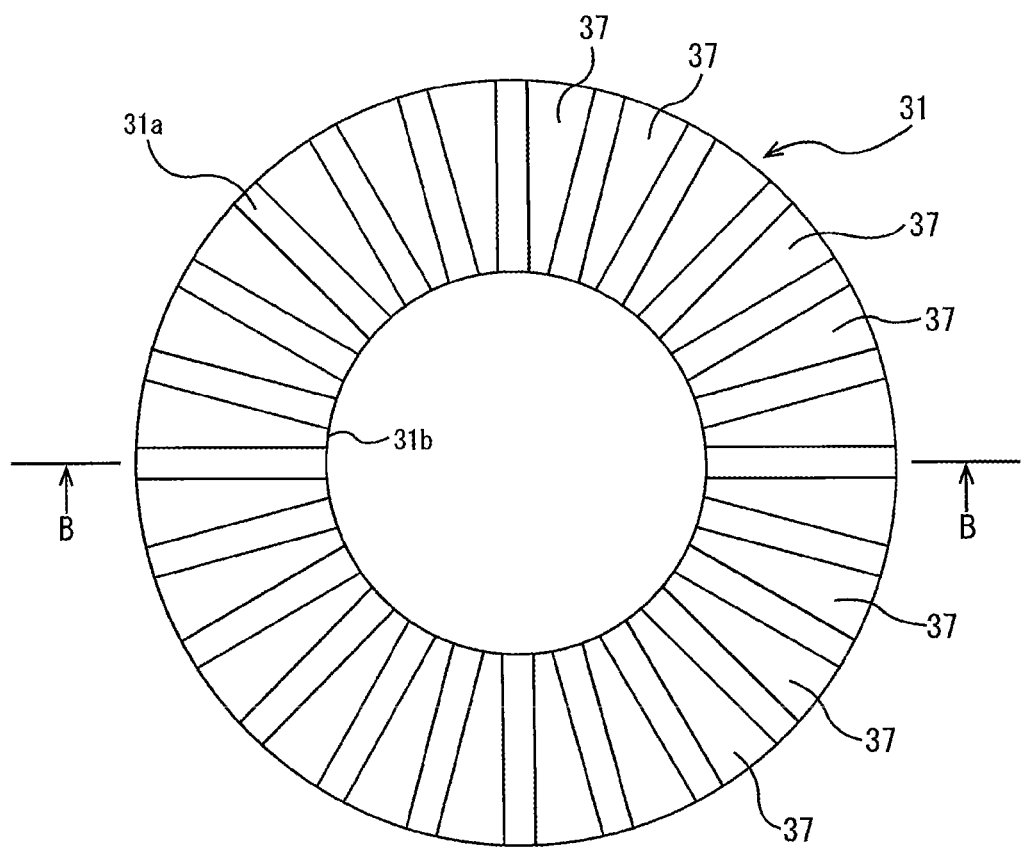
FIG. 4A is a plan view showing another embodiment of the seal body.
Figure 4B:
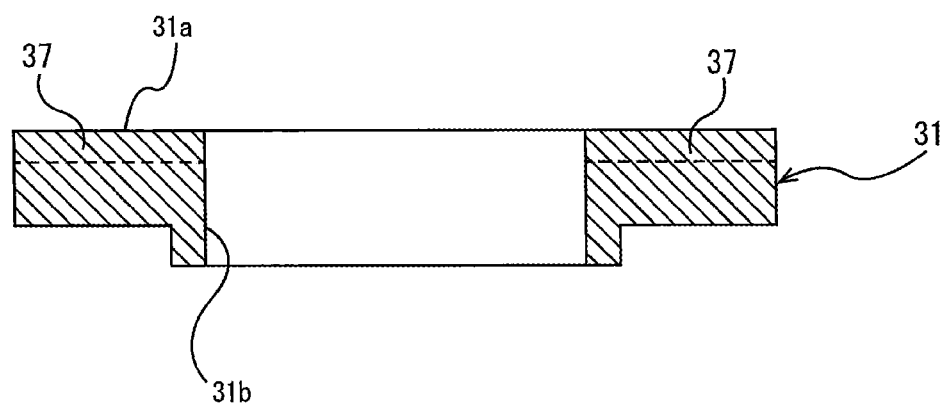
FIG. 4B is a cross-sectional view taken alone line B-B of FIG. 4A.

FIG. 4A is a plan view showing another embodiment of the seal body 31, and FIG. 4B is a cross-sectional view taken alone line B-B of FIG. 4A. As shown in FIGS. 4A and 4B, the upper surface 31a of the seal body 31 has a plurality of grooves 37 formed therein, the grooves 37 radially extending from the inner circumferential surface of the seal body 31 (i.e., the through-hole 31b) to the outer circumferential surface of the seal body 31, In the embodiment shown in FIG. 4A, 24 grooves 37 are formed. However, the number of grooves 37 may be greater or smaller than 24. The grooves 37 extend radially, and each of the grooves 37 has a width which gradually increases in a radially outward direction of the seal body 31. The seal body 31 with such grooves 37 formed therein is also capable of efficiently applying centrifugal forces, by the rotation of the seat body 31, to the liquid that exists in the gap between the upper surface 31a of the seal body 31 and the lower surface 35b of the upper casing 35, and producing a large centrifugal force field in the gap. Needless to say, since the upper surface 31a of the seal body 31 has the purpose of applying centrifugal forces to the liquid flowing on the upper surface 31a, the grooves 37 may be inclined to the radial direction of the seal body 31, or may not extend linearly. Furthermore, the width of each of the grooves 37 may not gradually increase in the radially-outward direction.

Figure 5A:
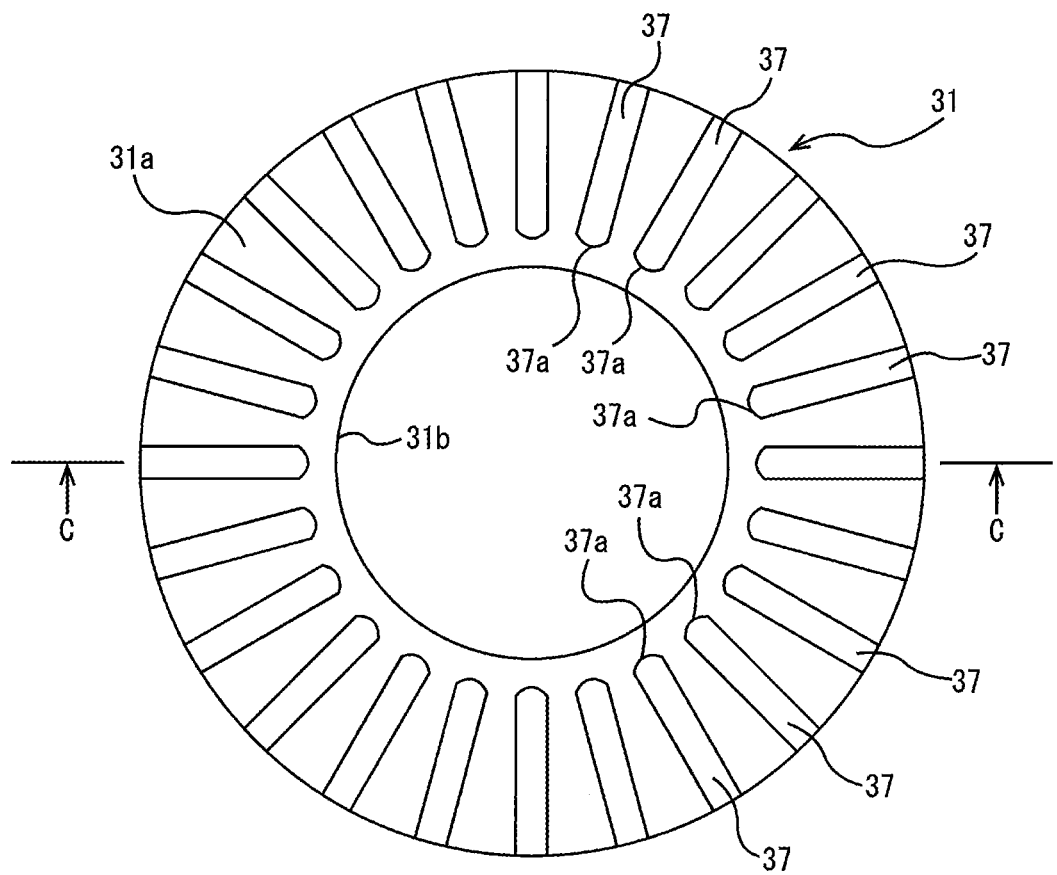
FIG. 5A is a plan view showing still another embodiment of the seal body.
Figure 5B:
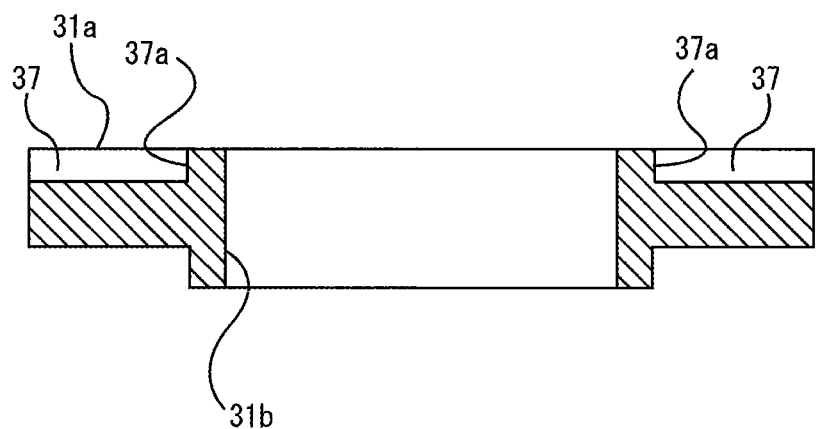
FIG. 5B is a cross-sectional view taken alone line C-C of FIG. 5A.

FIG. 5A is a plan view showing still another embodiment of the seal body 31, and FIG. 5B is a cross-sectional view taken alone line C-C of FIG. 5A. Structures, which will not be described particularly in this embodiment, are identical to those of the seal body 31 shown in FIGS. 3A and 3B, and repetitive descriptions thereof are omitted. In this embodiment also, a plurality of radially-extending grooves 37 are formed in the upper surface 31a of the seal body 31. However, an inner end 37a of each of the grooves 37 does not reach the inner circumferential surface of the seal body 31 (i.e., the through-hole 31b). Specifically, the inner end 37a of each of the grooves 37 in this embodiment is positioned between the inner circumferential surface and the outer circumferential surface of the seal body 31. Each of the grooves 37 has a width which is constant from the inner end 37a to the outer end thereof. The seal body 31 with such grooves 37 formed therein is also capable of efficiently applying centrifugal forces, by the rotation of the seal body 31, to the liquid that exists in the gap between the upper surface 31a of the seal body 31 and the lower surface 35b of the upper casing 35, and producing a large centrifugal force field in the gap. Needless to say, since the upper surface 31a of the seal body 31 has the purpose of applying centrifugal forces to the liquid flowing on the upper surface 31a, the grooves 37 may be inclined to the radial direction of the seal body 31, or may not extend linearly. Furthermore, the width of each of the grooves 37 may not be constant.

Figure 6A:
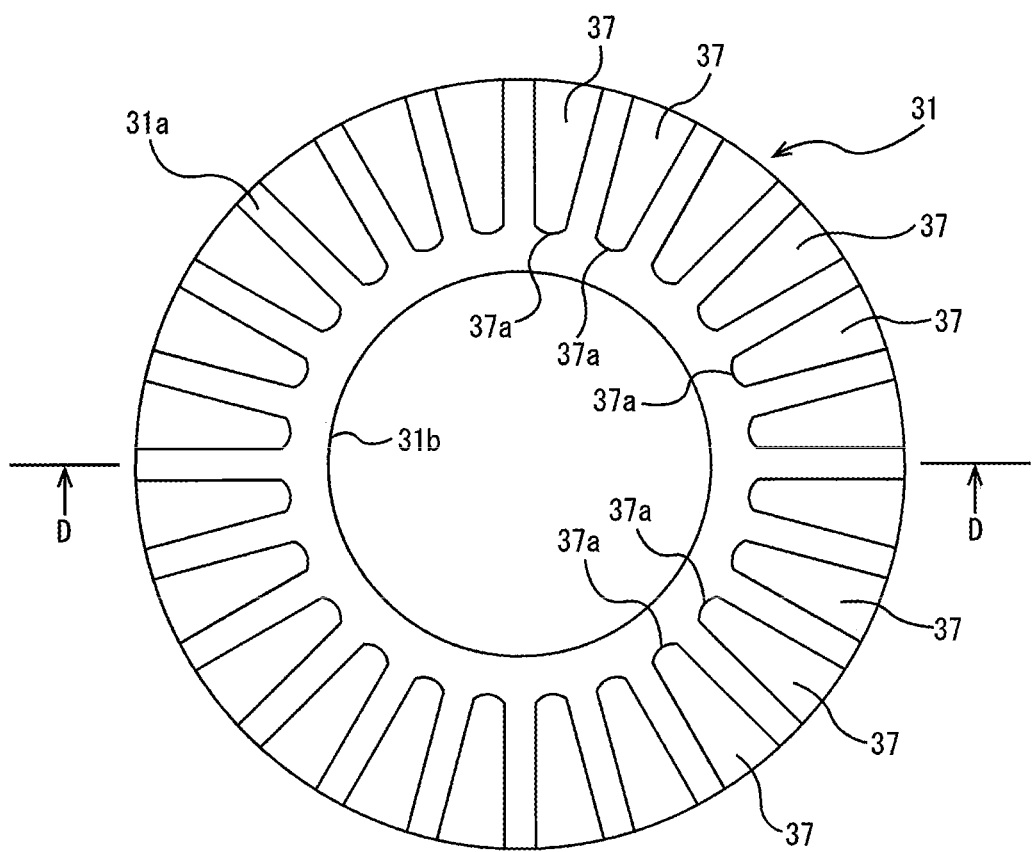
FIG. 6A is a plan view showing still another embodiment of the seal body.
Figure 6B:
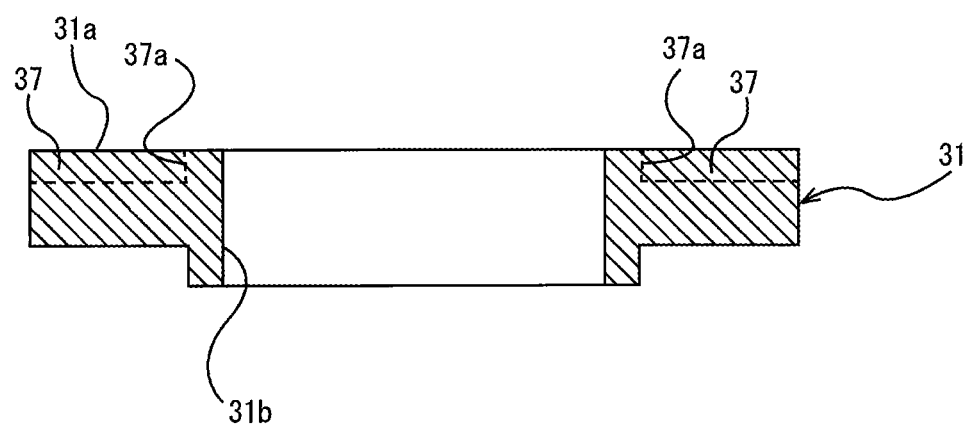
FIG. 6B is a cross-sectional view taken alone line D-D of FIG. 6A.

FIG. 6A is a plan view showing still another embodiment of the seal body 31, and FIG. 6B is a cross-sectional view taken alone line D-D of FIG. 6A. Structures, which will not be described particularly in this embodiment, are identical to those of the seal body 31 shown in FIGS. 4A and 4B, and repetitive descriptions thereof are omitted. In this embodiment also, a plurality of radially-extending grooves 37 are formed in the upper surface 31a of the seal body 31. However, an inner end 37a of each of the grooves 37 does not reach the inner circumferential surface of the seal body 31 (i.e., the through-hole 31b). Specifically, the inner end 37a of each of the grooves 37 in this embodiment are positioned between the inner circumferential surface and the outer circumferential surface of the seal body 31. Each of the grooves 37 has a width which gradually increases in a radially outward direction of the seal body 31. The seal body 31 with such grooves 37 formed therein is also capable of efficiently applying centrifugal forces, by the rotation of the seal body 31, to the liquid that exists in the gap between the upper surface 31a of the seal body 31 and the lower surface 35b of the upper casing 35, and producing a large centrifugal force field in the gap. Needless to say, since the upper surface 31a of the seal body 31 has the purpose of applying centrifugal forces to the liquid flowing on the upper surface 31a, the grooves 37 may be inclined to the radial direction of the seal body 31, or may not extend linearly. Furthermore, the width of each of the groove 37 may not gradually increase in the radially outward direction.

Figure 7:
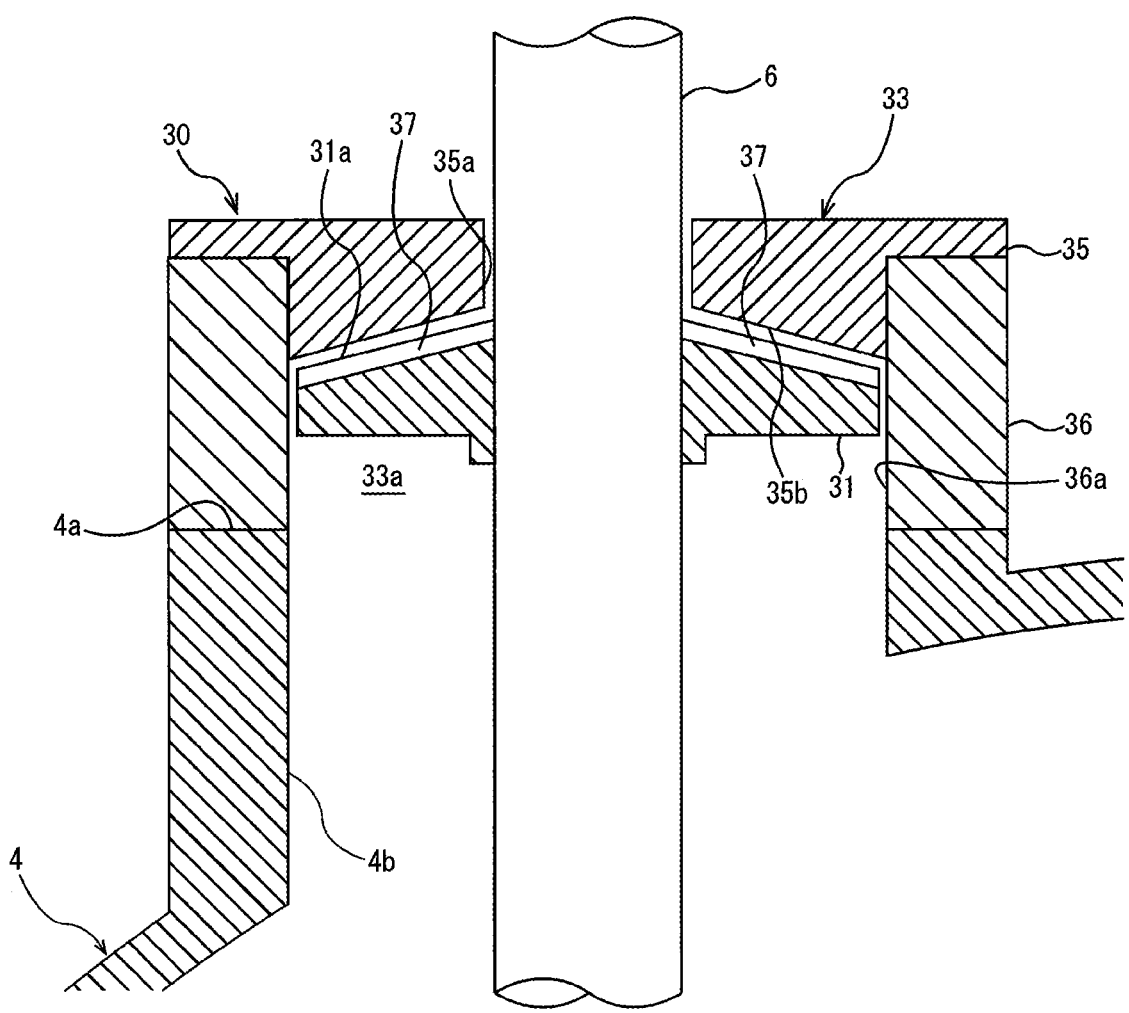
FIG. 7 is a cross-sectional view of a shaft seal device according to another embodiment.

FIG. 7 is a cross-sectional view of a shaft seal device 30 according to another embodiment. Structures, which will not be described particularly in this embodiment, are identical to those of the shaft seal device 30 shown in FIG. 2, and repetitive descriptions thereof are omitted. The seal body 31 of the shaft seal device 30 shown in FIG. 7 has an upper surface (annular surface) 31a inclined downwardly in a radially outward direction of the seal body 31. Specifically, the upper surface 31a of the seal body 31 is inclined downwardly with respect to a plane perpendicular to the axis of the rotational shaft 6.

In this embodiment, the upper surface 31a of the seal body 31 is inclined linearly. More specifically, as viewed in a cross section parallel to the axis of the rotational shaft 6, the lower surface 35b of the upper casing 35 is inclined linearly. The lower surface 35b of the upper casing 35 that faces the upper surface 31a of the seal body 31 across the gap, extends along the upper surface 31a of the seal body 31. More specifically, as viewed in the cross section parallel to the axis of the rotational shaft 6, the lower surface 35b of the upper casing 35 is parallel to the upper surface 31a of the seal body 31, and has the same inclination angle as the upper surface 31a of the seal body 31. Therefore, the size of the gap formed between the upper surface 31a of the seal body 31 and the lower surface 35b of the upper casing 35 (i.e., the distance between the upper surface 31a of the seal body 31 and the lower surface 35b of the upper casing 35) is constant.

As shown in FIG. 7, a plurality of grooves 37 are formed in the upper surface 31a of the seal body 31. The grooves 37 shown in FIG. 7 extend radially from the inner circumferential surface of the seal body 31 the through-hole 31b) to the outer circumferential surface of the seal body 31. Each of the grooves 37 may have a width which is constant from an inner end to an outer end thereof, as described with reference to FIGS. 3A and 3B, or may have a width which gradually increases in a radially outward direction of the seal body 31, as described with reference to FIGS. 4A and 4B. Moreover, the inner end 37a of each of the grooves 37 may be positioned between the inner circumferential surface and the outer circumferential surface of the seal body 31, as described with reference to FIGS. 5A and 5B or FIGS. 6A and 6B.

In this embodiment also, the gap between the upper surface 31a of the seal body 31 and the lower surface 35b of the upper casing 35 is designed in consideration of the rotational speed of the seal body 31, the diameter of the seal body 31, and the dynamic viscosity of the liquid such that a necessary and sufficient centrifugal force field is produced in the gap by the rotation of the seal body 31.

In this embodiment, the action of the grooves 37 of the rotating seal body 31 gives a circumferential velocity component to the liquid, so that centrifugal forces are generated in the liquid on the upper surface 31a of the seal body 31 and the liquid in the grooves 37. Furthermore, since the gap between the upper surface 31a of the seal body 31 and the lower surface 35b of the upper casing 35 is of appropriate dimensions, centrifugal forces can act on the liquid that exists in the gap.

As described above, in a case where the radius of the seal body 31, and the gap between the upper surface 31a of the seal body 31 and the lower surface 35b of the upper casing 35 are of appropriate dimensions, the grooves 37 may not be formed in the upper surface 31a of the seal body 31.

Figure 8:
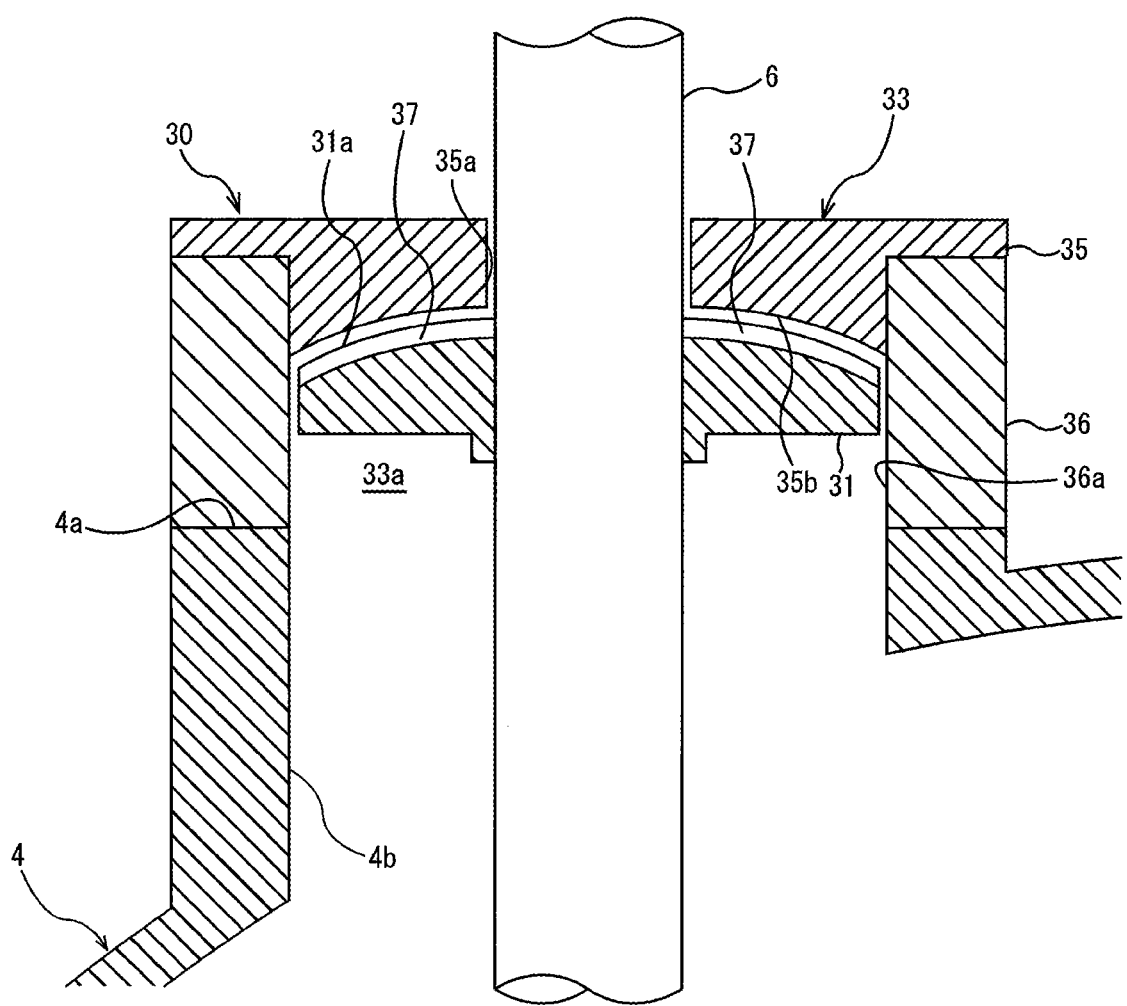
FIG. 8 is a cross-sectional view showing a modified example of the shaft seal device shown in FIG. 7.

FIG. 8 is a cross-sectional view showing a modified example of the shaft seal device 30 shown in FIG. 7. Structures, which will not be described particularly in this embodiment, are identical to those of the shaft seat device 30 shown in FIG. 7, and repetitive descriptions thereof are omitted. The seal body 31 of the shaft seal device 30 shown in FIG. 8 has also an upper surface (annular surface) 31a inclined downwardly in the radially outward direction of the seal body 31. However, this upper surface 31a is curved. More specifically, as viewed in a cross section parallel to the axis of the rotational shaft 6, the upper surface 31a of the seal body 31 is inclined curvedly.

A curvature of the upper surface 31a may be constant or may vary gradually. In a case where the curvature of the upper surface 31a is constant, the upper surface 31a extends in a circular arc. In a case where the curvature of the upper surface 31a varies gradually, the curvature of the upper surface 31a may increase gradually or decrease gradually from the inner circumferential surface of the seal body 31 the through-hole 31b) to the outer circumferential surface of the seal body 31. The lower surface 35b of the upper casing 35, which faces the upper surface 31a of the seal body 31 across the gap, extends along the upper surface 31a of the seal body 31. Specifically, the lower surface 35b of the upper casing 35 is formed such that the size of the gap between the upper surface 31a of the seal body 31 and the lower surface 35b of the upper casing 35 (i.e., the distance between the upper surface 31a of the seal body 31 and the lower surface 35b of the upper casing 35) is constant.

The shaft seal device 30 shown in FIG. 7 or 8 is also a non-contact shaft seal device in which the seal body 31 is not brought into sliding contact with other members, so that the seal body 31 does not wear. Therefore, the frequency of maintenance of the shaft seal device 30 can be greatly reduced. Furthermore, since the seal body 31 performs a sealing function in a non-contact manner, only heat due to fluid shearing forces is generated in the shaft seal device 30. Therefore, the amount of heat generated in the shaft seal device 30 is extremely small compared with shaft seal devices including components which are brought into sliding contact with each other, and thus it is not necessary to separately provide an ancillary facility for supplying a liquid, such as cooling water or a flushing liquid, into the shaft seal device. Furthermore, an accurate assembly of components as required in the mechanical seal is not required, because surfaces of components, such as the rotating ring and the stationary ring, do not need to be machined to precision finish.

Figure 9:
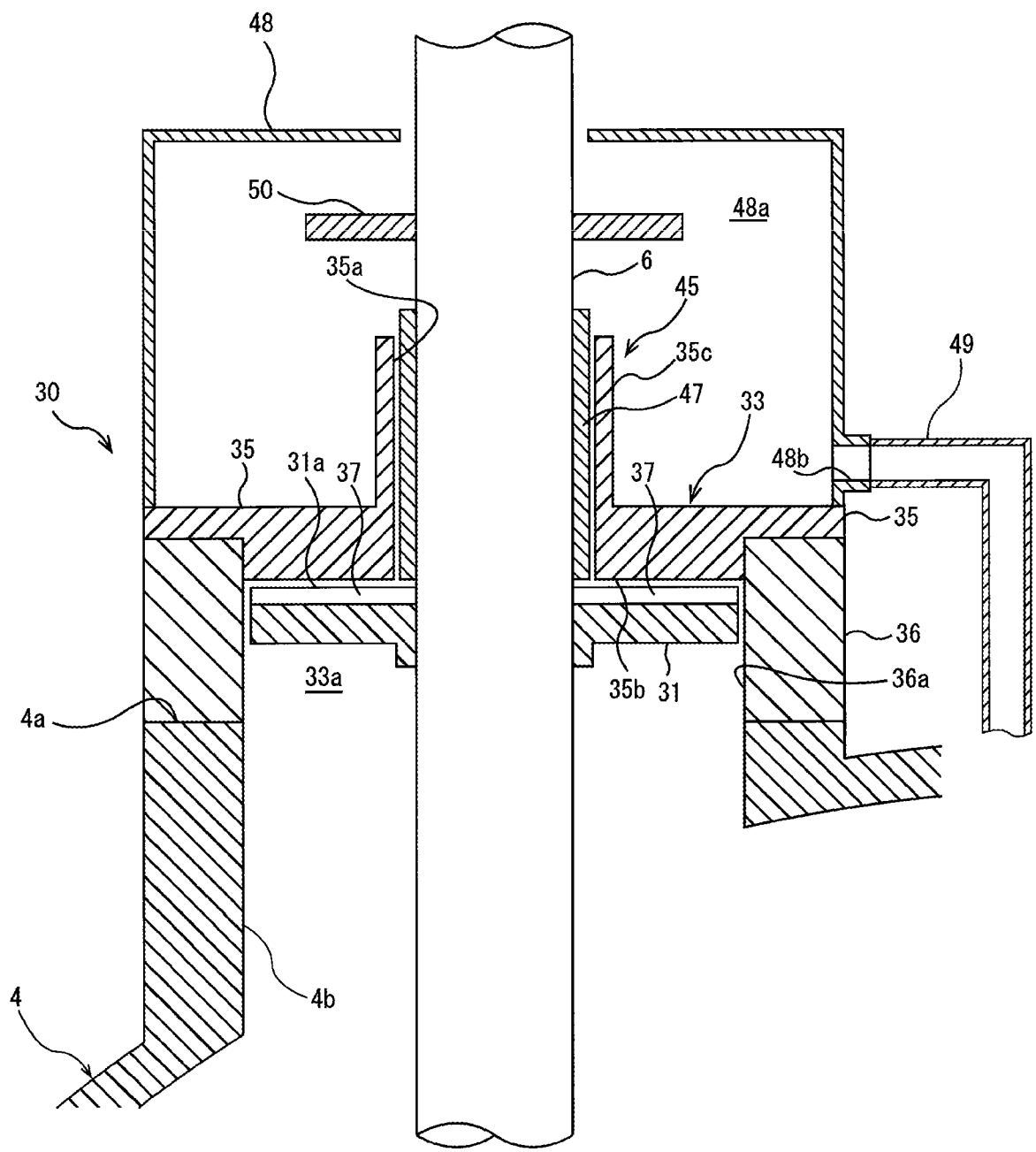
FIG. 9 is a cross-sectional view of a shaft seal device according to still another embodiment.

FIG. 9 is a cross-sectional view of a shaft seal device 30 according to still another embodiment. Structures, which will not be described particularly in this embodiment, are identical to those of the shaft seal device 30 shown in FIG. 2, and repetitive descriptions thereof are omitted. The shaft seal device 30 shown in FIG. 9 further includes a non-contact type upper seal structure 45 which seals a gap between the rotational shaft 6 and the through-bole 35a, the upper seal structure 45 being disposed above the seal body 31.

As shown in FIG. 9, the upper casing 35 has an extension-portion 35c extending upwardly along a longitudinal direction of the rotational shaft 6. The extension-portion 35c has a cylindrical shape and surrounds the rotational shaft 6. The through-hole 35a, through which the rotational shaft 6 extends, is formed by an entire inner circumferential surface of the upper casing 35 including the extension portion 35c. A sleeve 47 is fixed to an outer circumferential surface of the rotational shaft 6, and this sleeve 47 extends vertically through the through-hole 35a of the upper casing 35. A gap is formed between an outer circumferential surface of the sleeve 47 and the through-hole 35a.

The non-contact type upper seal structure 45 according to this embodiment is a labyrinth seal which is constituted of the extension-portion 35c of the upper casing 35 and the sleeve 47. The non-contact type upper seal structure 45 may be a flat seal without a labyrinth structure.

The labyrinth structure of the labyrinth seal has, for example, a plurality of parallel grooves (not shown) formed in the through-hole 35a. The parallel grooves of the labyrinth structure may be formed in the outer circumferential surface of the sleeve 47 or may be formed in both the through-hole 35a and the outer circumferential surface of the sleeve 47. The parallel grooves are parallel to each other. Each of the parallel grooves extends in the through-hole 35a and/or on the outer circumferential surface of the sleeve 47, and in a plane perpendicular to the axis of the rotational shaft 6. The distances between adjacent ones of the parallel grooves may be equal to or different from each other. Further, an apex of each of the parallel grooves has an arbitrary cross-sectional shape. For example, the apex of each of the parallel grooves may have a triangular cross-sectional shape, a square cross-sectional shape, or a trapezoidal cross-sectional shape. Alternatively, the apex of each of the parallel grooves may have a rounded cross-sectional shape (e.g., a hemispherical cross-sectional shape).

The grooves of the labyrinth structure may be a screw groove extending helically in the through-hole 35a and/or on the outer circumferential surface of the sleeve 47. A direction of turn of the helically extending screw groove is preferably a direction that produces a pump action to push the liquid back toward the seal chamber 33a when the rotational shaft 6 is rotated. Specifically, it is preferred that the screw groove extends helically in a direction opposite to the direction in which the rotational shaft 6 rotates. The pitch and number of threads of the screw groove are arbitrary. For example, one screw groove may be formed at irregular pitches in the through-hole 35a and/or on the outer circumferential surface of the sleeve 47, or multiple-thread screw grooves may be formed in the through-hole 35a and/or on the outer circumferential surface of the sleeve 47. An apex of the screw groove has an arbitrary cross-sectional shape. For example, the apex of the screw groove may have a triangular cross-sectional shape, a square cross-sectional shape, or a trapezoidal cross-sectional shape. Alternatively, the apex of the screw groove may have a rounded cross-sectional shape (e.g., a hemispherical cross-sectional shape).

Further, the shaft seal device 30 has a leakage liquid cover 48 surrounding the upper seal structure 45. The leakage liquid cover 48 is fixed to an upper surface of the upper casing 35. An opening 48b, which provides a fluid communication between an inner space 48a and an exterior of the leakage liquid cover 48, is formed in a side wall of the leakage liquid cover 48. The opening 48b enables the inner space 48a to communicate with the exterior of the leakage liquid cover 48. Further, a leakage liquid pipe 49 is coupled to the opening 48b. The leakage liquid pipe 49 extends into the suction sump 5 (see FIG. 1), and has a distal end located above the liquid level in the suction sump 5. In an embodiment, the distal end of the leakage liquid pipe 49 may be located above a side ditch (not shown) formed in the pump installation floor 22 (see FIG. 1). The liquid that has flowed from the leakage liquid pipe 49 into the side ditch may be returned through the side ditch into the suction sump 5, or may be collected in a collection reservoir, such as a tank (not shown). The leakage liquid cover 48 may have a plurality of openings 48b. In this case, leakage liquid pipes 49 are coupled to each of openings 48b.

When the pressure of the liquid. that exists in the seal chamber 33a of the seal casing 33 is higher than centrifugal forces applied to the liquid that exists in the gap between the upper surface 31a of the seal body 31 and the lower surface 35b of the upper easing 35 by the rotation of the seal body 31, the liquid reaches the upper seal structure 45. In this case, the liquid is depressurized while passing through the upper seal structure 45, and flows into the inner space 48a of the leakage liquid cover 48.

Since the inner space 48a of the leakage liquid cover 48 is coupled to the leakage liquid pipe 49 through the opening 48b, and the distal end of the leakage liquid pipe 49 is in communication with atmosphere in suction sump 5, the liquid that has leaked into the inner space 48a is returned to the suction sump 5. Therefore, the liquid is prevented from leaking out of the leakage liquid cover 48. In a case where the distal end of the leakage liquid pipe 49 is located above the side ditch (not shown) formed in the pump installation floor 22 (see FIG. 1), the distal end of the leakage liquid pipe 49 is in communication with atmosphere above the side ditch, and thus the liquid that has leaked into the inner space 48a is returned through the side ditch to the suction sump 5, or collected in the collection tank.

As shown in FIG. 9, a water eddy plate 50 may be fixed to the rotational shaft 6 in the inner space 48a of the leakage liquid cover 48. The water eddy plate 50 is disposed above the upper seal structure 45. The liquid that has passed through the upper seal structure 45 collides with the water eddy plate 50, thereby enabling a direction of movement of the liquid to be changed sideways or downwardly.

The upper seal structure 45 is a non-contact seal in which the sleeve 47 rotatable together with the rotational shaft 6 does not contact with the upper casing 35. Therefore, the sleeve 47 and the upper casing 35 do not wear, and. thus the frequency of maintenance of the upper seal structure 45 can be greatly reduced. Furthermore, since he upper seal structure 45 performs a sealing function in a non-contact manner, frictional heat is not generated, and thus it is not necessary to supply a liquid, such as cooling water and a flushing liquid, into the upper seal structure 45.

The upper seal structure 45 serves as an auxiliary seal that prevents the liquid from leaking out of the shaft seal device 30 even if the static pressure of the liquid generated in the gap between the upper surface 31a of the seal body 31 and the lower surface 35b of the upper casing 35 by the rotating seal body 31 is lower than the static pressure of the liquid that exists in the seal chamber 33a. In an embodiment, the shapes and dimensions of the seal body 31 and/or the configurations of the upper seal structure 45 may be designed appropriately to regulate the amount of liquid passing through the upper seal structure 45.

Figure 10:
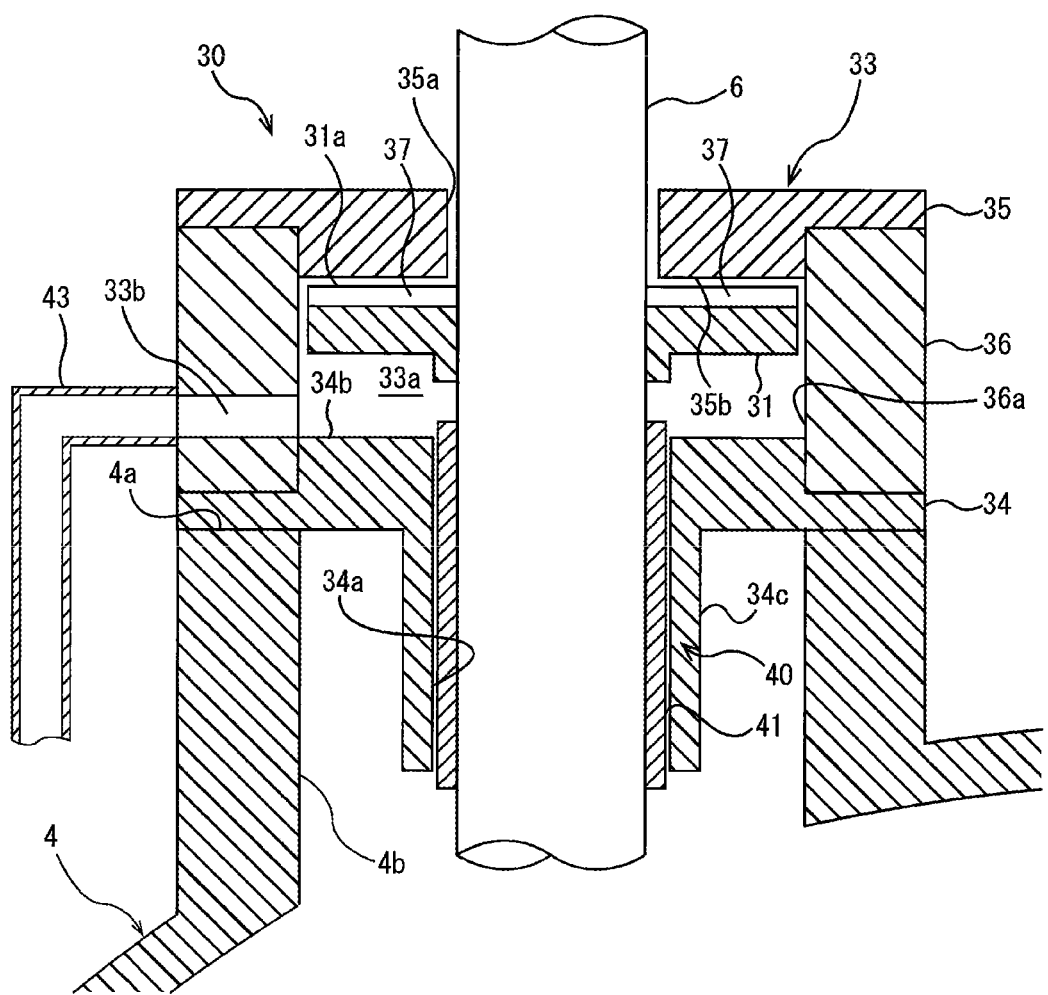
FIG. 10 is a cross-sectional view of a shaft seal device according to still another embodiment.

FIG. 10 is a cross-sectional view of a shaft seal device 30 according to still another embodiment. Structures, which will not be described particularly in this embodiment, are identical to those of the shaft seal device 30 shown in FIG. 2, and repetitive descriptions thereof are omitted. The shaft seal device 30 shown in FIG. 10 has a seal casing 33 that includes not only the upper casing 35 and the intermediate casing 36, but also a lower casing 34. In the following descriptions, the through-hole 35a of the upper casing 35 is referred to as an upper through-hole 35a, and the extension-portion 35c of the upper casing 35 is referred to as an upper extension-portion 35c.

The lower casing 34 has a lower through-hole 34a formed therein, through which the rotational shaft 6 extends. A center line of the lower through-hole 34a is aligned with the axis of the rotational shaft 6. The intermediate casing 36 has a cylindrical inner circumferential surface 36a. The intermediate casing 36 is sandwiched between the lower casing 34 and the upper easing 35, and fixed to the lower casing 34 and the upper casing 35. Thus, the seal chamber 33a, which houses the seal body 31, is formed in the seal casing 33.

In this embodiment, the seal chamber 33a is defined by the lower surface 35b of the upper casing 35, the inner circumferential surface 36a of the intermediate casing 36, and an upper surface 34b of the lower casing 34. The seal body 31 is fixed to the rotational shaft 6 in the seal chamber 33a. The lower surface 35b of the upper casing 35 and the upper surface 34b of the lower casing 34 are flat surfaces perpendicular to the axis of the rotational shaft 6. The inner circumferential surface 36a of the intermediate casing 36 is concentric to the outer circumferential surface of the rotational shaft 6. The seal chamber 33a communicates with the lower through-hole 34a and the upper through-hole 35a, and is positioned between the lower through-hole 34a and the upper through-hole 35a. The rotational shaft 6 extends vertically through the lower through-hole 34a, the seal chamber 33a, and the upper through-hole 35a.

In this embodiment, the lower casing 34 has a lower extension-portion 34c extending downwardly along the longitudinal direction of the rotational shaft 6. The lower extension-portion 34c has a cylindrical shape, and surrounds the rotational shaft 6. The lower through-hole 34a, through which the rotational shaft 6 extends, is formed by an entire inner circumferential surface of the lower casing 34 including the extension-portion 34c.

As shown in FIG. 10, the shaft seal device 30 is fixed to a shaft-seal-device mounting surface 4a of the discharge elbow 4 so as to close the through-hole 4b formed in the discharge elbow 4. In this embodiment, a lower surface of the tower casing 34 is coupled to the shaft-seal-device mounting surface 4*a*.

Furthermore, a sleeve 41 is fixed to the outer circumferential surface of the rotational shaft 6, and this sleeve 41 extends vertically through the lower through-hole 34*a* of the lower casing 34. A gap is formed between an outer circumferential surface of the sleeve 41 and the lower through-hole 34*a*.

In this embodiment, a lower seat structure 40 is constituted of the lower extension 34*c* of the lower casing 34 and the sleeve 41. The lower seal structure 40 may be a labyrinth seal having a labyrinth structure, or a flat seal without a labyrinth structure.

The labyrinth structure of the labyrinth seal has, for example, a plurality of parallel grooves (not shown) formed in the lower through-hole 34*a*. The parallel grooves of the labyrinth structure may be formed in the outer circumferential surface of the sleeve 41, or may be formed in both the lower through-hole 34*a* and the outer circumferential surface of the sleeve 41. The parallel grooves are parallel to each other. Each of the parallel grooves extends in the lower through-hole 34*a* and/or on the outer circumferential surface of the sleeve 41, and in a plane perpendicular to the axis of the rotational shaft 6. The distances between adjacent ones of the parallel grooves may be equal to or different from each other. An apex of each of the parallel grooves has an arbitrary cross-sectional shape. For example, the apex of each of the parallel grooves may have a triangular cross-sectional shape, a square cross-sectional shape, or a trapezoidal cross-sectional shape. Alternatively, the apex of each of the parallel grooves may have a rounded cross-sectional shape (e.g., a hemispherical cross-sectional shape).

The move of the labyrinth structure may be a screw groove extending helically in the lower through-hole 34*a* and/or on the outer circumferential surface of the sleeve 41. The direction of turn of the helically extending screw groove is preferably a direction that produces a pump action to push the liquid back toward the through-hole 4*b* formed in the discharge elbow 4, when the rotational shaft 6 is rotated. Specifically, it is preferred that the screw groove extend helically in a direction opposite to the direction in which the rotational shaft 6 rotates. The pitch and number of threads of the screw groove are arbitrary. For example, one screw groove may be formed at irregular pitches in the lower through-hole 34*a* and/or on the outer circumferential surface of the sleeve 41, or multiple-thread screw grooves may be formed in the lower through-hole 34*a* and/or on the outer circumferential surface of the sleeve 41. An apex of the screw groove has an arbitrary cross-sectional shape. For example, the apex of the screw groove may have a triangular cross-sectional shape, a square cross-sectional shape, or a trapezoidal cross-sectional shape. Alternatively, the apex of the screw groove may have a rounded cross-sectional shape (e.g., a hemispherical cross-sectional shape).

An opening 33*b*, which communicates with the seal chamber 33*a*, is formed in a side wall of the seal casing 33, more specifically in the intermediate casing 36. This opening 33*b* extends from the seal chamber 33*a* to an outer surface of the seal casing 33 (i.e., an outer surface of the intermediate casing 36). The opening 33*b* shown in FIG. 10 extends in a radial direction of the rotational shaft 6. In an embodiment, the opening 33*b* may extend upwardly or downwardly with respect to the radial direction of the rotational shaft 6. Alternatively, the opening 33*b* may extend obliquely with respect to the radial direction of the rotational shaft 6. This opening 33*b* enables the seal chamber 33*a* to communicate with the exterior of the seal casing 33. A drain pipe 43 is coupled to the opening 33*b*. The drain pipe 43 extends into the suction sump 5 (see FIG. 1), and has a distal end located above the liquid level in the suction sump 5.

In an embodiment, the distal end of the drain pipe 43 may be located above a side ditch (not shown) formed in the pump installation floor 22 (see FIG. 1). The liquid that has flowed from the drain pipe 43 into the side ditch may be returned through the side ditch into the suction sump 5, or may be collected in a collection reservoir, such as a tank (not shown).

A plurality of openings 33*b* may be formed. In this case, the distances between adjacent ones of the openings 33*b* are arbitrary. For example, two openings 33*b* that are 180° apart from each other in a circumferential direction of the inner circumferential surface 36*a* of the intermediate casing 36 may be formed in the side wall of the seal casing 33, or four openings 33*b* that are 90° apart from each other in a circumferential direction of the inner circumferential surface 36*a* of the intermediate casing 36 may be formed in the side wall of the seal casing 33. In a case where a plurality of openings 33*b* are formed, drain pipes 43 are coupled to each of the openings 33*b*.

Part of the liquid flowing in the discharge elbow 4 (see FIG. 1) toward the discharge pipe 20, flows through the through-hole 4*b* into the lower seal structure 40. Further, the liquid flows through the lower seal structure 40 into the seal chamber 33*a*. The liquid is depressurized while passing through the lower seal structure 40. The liquid, which has passed through the lower seal structure 40 and reached the seal chamber 33*a*, flows through the opening 33*b* formed in the side wall of the seal casing 33, into the drain pipe 43, and is returned to the suction sump 5. Since the liquid that has reached the seal chamber 33*a* is returned to the suction sump 5 through the drain pipe 43 which is in communication with atmosphere, the pressure of the liquid in the seal chamber 33*a* of the seal casing 33 is lowered. Therefore, the pressure of the liquid to be generated by the seal body 31 for preventing the liquid leakage is lower than that of the embodiment shown in FIG. 2. As a result, the shaft seal device 30 according to this embodiment can prevent a liquid having a higher pressure, compared with the shaft seal device 30 shown in FIG. 2, from leaking. Furthermore, in comparing the shaft seal device 30 according to this embodiment and the shaft seal device 30 shown in FIG. 2, the diameter of the seal body 31 can be reduced. Thus, the size of the shaft seal device 30 (particularly, the size of the shaft seal device 30 in a direction perpendicular to the axis of the rotational shall 6) can be reduced.

In this embodiment, the pressure of the liquid in the seal. chamber 33*a* can be regulated by changing the number of openings 33*b* and/or the size of the diameter of the openings 33*b*. Accordingly, the liquid is prevented from passing through the upper through-hole 35*a* of the seal casing 33 by designing the number of openings 33*b* and/or the size of the diameter of the openings 33*b* such that the pressure of the liquid in the seal chamber 33*a* becomes lower than centrifugal forces applied to the liquid flowing on the upper surface 31 a of the seal body 31 by the rotating seal body 31.

In this embodiment, the rotating seal body 31 gives a circumferential velocity component to the liquid that exists below the seal body 31 in the seal chamber 33*a*. Therefore, centrifugal forces also act on the liquid that exists below the seal body 31 in the seal chamber 33*a*, increasing the static pressure of the liquid in the seal chamber 33*a*. If the difference between the static pressure of the liquid that is generated in the gap between the upper surface 31*a* of the seal body 31 and the lower surface 35*b* of the upper casing 35, and the static pressure of the liquid that exists in the seal chamber 33*a* is reduced, the liquid is likely to leak out of the seal casing 33. Therefore, it is preferred that the volume of the liquid that exists below the seal body 31 is sufficiently larger than the volume of the gap between the upper surface 31*a* of the seal body 31 and the lower surface 35*b* of the upper casing 35. For example, by increasing the distance between the lower surface of the seal body 31 and the upper surface 34*b* of the lower casing 34, the volume of the liquid that exists below the seal body 31 can be increased.

The lower seal structure 40 is a non-contact type seal in which the sleeve 41 rotatable together with the rotational shaft 6 does not contact with the lower casing 34. Therefore, the sleeve 41 and the lower casing 34 do not wear, and thus the frequency of maintenance of the lower seal structure 40 can be greatly reduced. Furthermore, since the lower seal structure 40 performs a sealing function in a non-contact manner, frictional heat is not generated, and thus it is not necessary to supply a liquid, such as cooling water or flushing liquid, into the lower seal structure 40.

Figure 11:
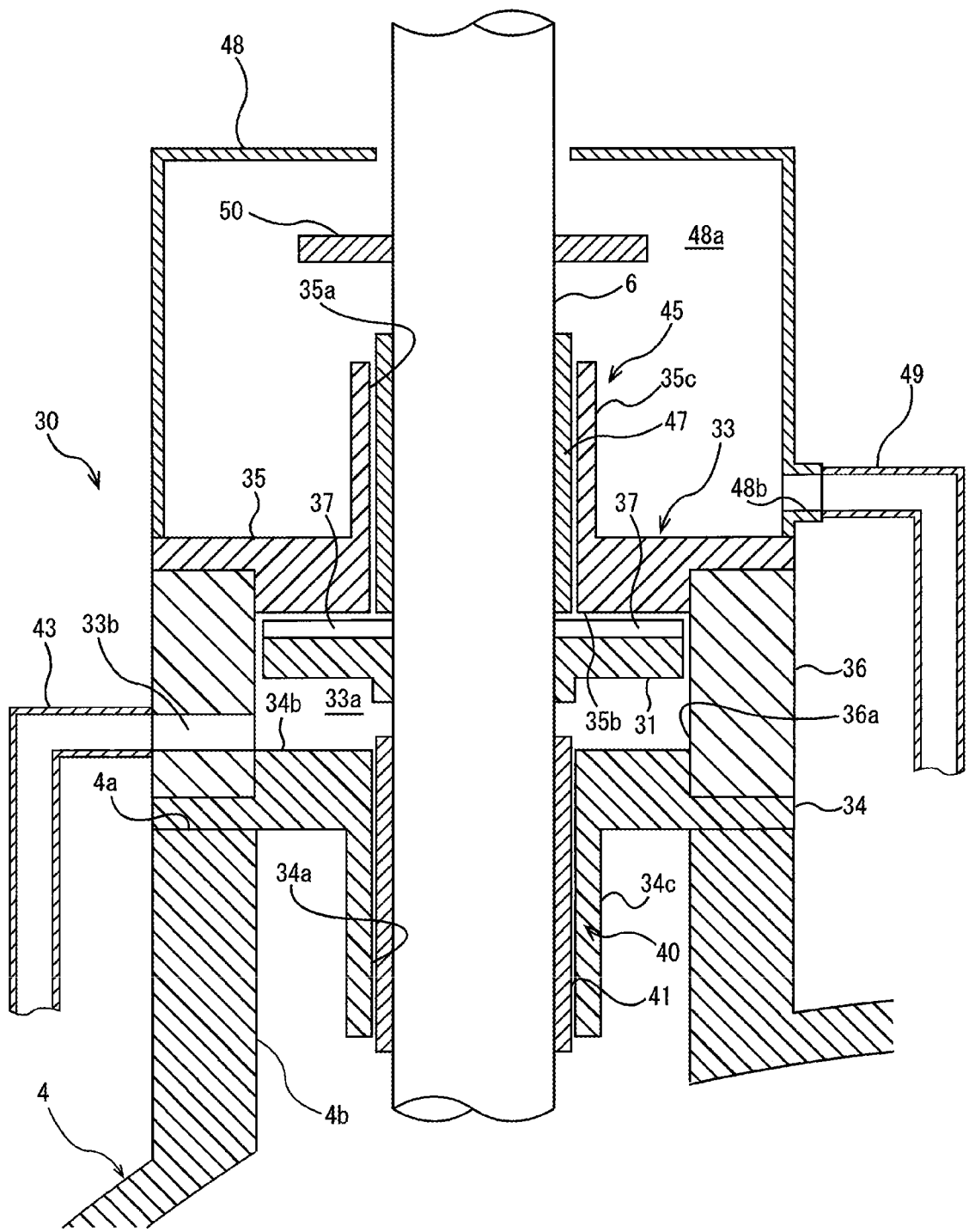
FIG. 11 is a cross-sectional view of a shaft seal device according to still another embodiment.

FIG. 11 is a cross-sectional view of a shaft seal device 30 according to still another embodiment. Structures, which will not be described particularly in this embodiment, are identical to those of the shaft seal device 30 shown in FIG. 10, and repetitive descriptions thereof are omitted. In the shaft seal device 30 shown in FIG. 11, the upper seal structure 45 described with reference to FIG. 9 is mounted to the shaft seal device 30 shown in FIG. 10. Therefore, structures of the upper seal structure 45 in this embodiment are identical to those of the upper seal structure 45 shown in FIG. 9, and detailed descriptions of the upper seal structure 45 are omitted.

As shown in FIG. 11, a seal casing 33 of the shaft seal device 30 according to this embodiment includes also the upper casing 35, the lower casing 34, and the intermediate casing 36 sandwiched between the upper casing 35 and the lower casing 34. The seal body 31 is fixed to the rotational shaft 6 in a seal chamber 33*a* that is defined by the lower surface 35*b* of the upper casing 35, the inner circumferential surface 36*a* of the intermediate casing 36, and the upper surface 34*b* of the lower casing 34.

The upper casing 35 has the upper extension-portion 35*c* extending upwardly along the longitudinal direction of the rotational shaft 6. The upper through-hole 35*a*, through which the rotational shaft 6 extends, is formed by the entire inner circumferential surface of the upper casing 35 including the upper extension-portion 35*c*. The sleeve 47 is fixed to the outer circumferential surface of the rotational shaft 6, and this sleeve 47 extends vertically through the upper through-hole 35*a* of the upper casing 35. The gap is formed between the outer circumferential surface of the sleeve 47 and the upper through-hole 35*a*. As described above, the non-contact type upper seal structure 45 in this embodiment is a labyrinth seal or a flat seal which is constituted of the extension-portion 35*c* of the upper casing 35 and the sleeve 47.

The lower casing 34 has the lower extension-portion 34*c* extending downwardly in the longitudinal direction of the rotational shaft 6. The lower through-hole 34*a*, through which the rotational shaft 6 extends, is formed by the entire inner circumferential surface of the lower casing 34 including the lower extension-portion 34*c*. The sleeve 41 is fixed to the outer circumferential surface of the rotational shaft 6, and this sleeve 41 extends vertically through the lower through-hole 34*a* of the lower casing 34. The gap is formed between the outer circumferential surface of the sleeve 41 and the lower through-hole 34*a*. As described above, the non-contact type lower seal structure 40 in this embodiment is a labyrinth seal or a flat seal which is constituted of the lower extension-portion 34*c* of the lower casing 34 and the sleeve 41. The rotational shaft 6 extends vertically through the lower through-hole 34*a*, the seal chamber 33*a*, and the upper through-hole 35*a*.

According to this embodiment, the liquid that passes through the lower seal structure 40 and flows into the seal chamber 33*a* is depressurized While passing through the lower seal structure 40. Further, a part of the liquid, which has passed through the lower seal structure 40 and reached the seal chamber 33*a*, flows through the opening 33*b*, formed in the side wall of the seal casing 33, into the drain pipe 43, and is returned to the suction sump 5. Since a part of the liquid, which has reached the seal chamber 33*a*, is returned to the suction sump 5 through the drain pipe 43 which is in communication with atmosphere, the pressure of the liquid in the seal chamber 33*a* of the seal casing 33 is lowered. Therefore, the pressure of the liquid to be generated by the seal body 31 for preventing the liquid leakage can be reduced.

Furthermore, even if the pressure of the depressurized liquid that exists in the seal chamber 33*a* of the seal casing 33 is higher than centrifugal forces applied to the liquid that exists in the gap between the upper surface 31*a* of the seal body 31 and the lower surface 35*b* of the upper casing 35 by the rotation of the seal body 31, the liquid is further depressurized while passing through the upper seal structure 45, and flows into the inner space 48*a* of the leakage liquid cover 48. However, the liquid that has flowed into the inner space 48*a* of the leakage liquid cover 48 is returned through the leakage liquid pipe 49 to the suction sump 5. Accordingly, this shaft seal device 30 is able to reliably prevent the liquid leakage. In an embodiment, it is possible to prevent the liquid from passing through the upper through-hole 35*a* of the seal casing 33 by appropriately designing the shapes and dimensions of the seal body 31, the configurations of the upper seal structure 45, and the configurations of the lower seal structure 40. Alternatively, the amount of liquid passing through the upper seal structure 45 may be regulated by appropriately designing the shapes and dimensions of the seal body 31, the configurations of the upper seal structure 45, and the configurations of the lower seal structure 40.

Although not shown, the upper surface 31*a* of the seal body 31 shown in FIG. 9, 10, or 11 may be inclined downwardly in the radially outward direction of the seal body 31 (see FIG. 7). Similarly, the upper surface 31*a* of the seal body 31 shown in FIG. 9, 10, or 11 may be inclined downwardly in the radially outward direction of the seal body 31, and be further curved (see FIG. 8).

The shaft seal device 30 according to this embodiment is a non-contact shaft seal device in which the seal body 31 is not brought into sliding contact with other members, so that the seal body 31 does not wear. Therefore, the frequency of maintenance of the shaft seal device 30 can be greatly reduced. Furthermore, since the seal body 31 performs a sealing function in a non-contact manner, only heat due to fluid shearing forces is generated in the shaft seal device 30. Therefore, the amount of heat generated in the shaft seal device 30 is extremely small compared with shaft seal devices including components which are brought into sliding contact with each other, and thus it is not necessary to separately provide an ancillary facility for supplying a liquid, such as cooling water or a flushing liquid, into the shaft seal device. Furthermore, an accurate assembly of components as required in the mechanical seal is not required, because surfaces of components, such as the rotating ring and the stationary ring, do not need to be machined to precision finish.

Furthermore, the upper seal structure 45 is a non-contact type seal in which the sleeve 47 rotatable together with the rotational shaft 6 does not contact with the upper casing 35. Similarly, the lower seal structure 40 is a non-contact type seal in which the sleeve 41 rotatable together with the rotational shaft 6 does not contact with the lower casing 34. Therefore, the frequency of maintenance of the upper seal structure 45 and the lower seal structure 40 can be greatly reduced. Furthermore, since the upper seal structure 45 and the lower seal structure 40 perform a sealing function in a non-contact manner, frictional heat due to contact is not generated, and thus it is not necessary to supply a liquid, such as cooling water and a flushing liquid, into the upper seal structure 45 and the lower seal structure 40.

In the above embodiments, abrasion powder of the seal body 31 is not produced, because the seat body 31 of the shaft seal device 30 does not contact with other members. Similarly, abrasion powder is not produced from the upper seal structure 45 and the lower seal structure 40, because the upper seal structure 45 and the lower seal structure 40 are the non-contact type seal, respectively. Therefore, the shaft seal device 30 according to the above embodiments can be installed in a vertical pump for delivering a liquid (e.g., drinking water) which must meet stringent quality requirements.

Using the shaft seal device 30 shown in FIG. 11, experiments for measuring the amount of liquid that passed through the upper seal structure 45 were conducted. The shaft seal device 30 used in the experiments was connected to a tank which stored water set to a predetermined pressure, and the amount of water discharged from the leakage liquid pipe 49 was measured when the rotational shaft 6 was rotated. As Comparative Example 1, the amount of water discharged from the leakage liquid pipe 49 was measured when the rotational shaft 6, to which a seal body 31 having grooves 37 formed, instead of the upper surface 31a, in a lower surface thereof was attached, was rotated. Furthermore, as Comparative Example 2, the amount of water discharged from the leakage liquid pipe 49 was measured using a shaft seal device 30 in which the seal body 31 is not attached to the rotational shaft 6. For convenience in descriptions of the experiments, in the following descriptions, the amount of liquid that has passed through the upper seal structure 45 and been discharged from the leakage liquid pipe 49 is referred to as "passed amount".

Figure 12:
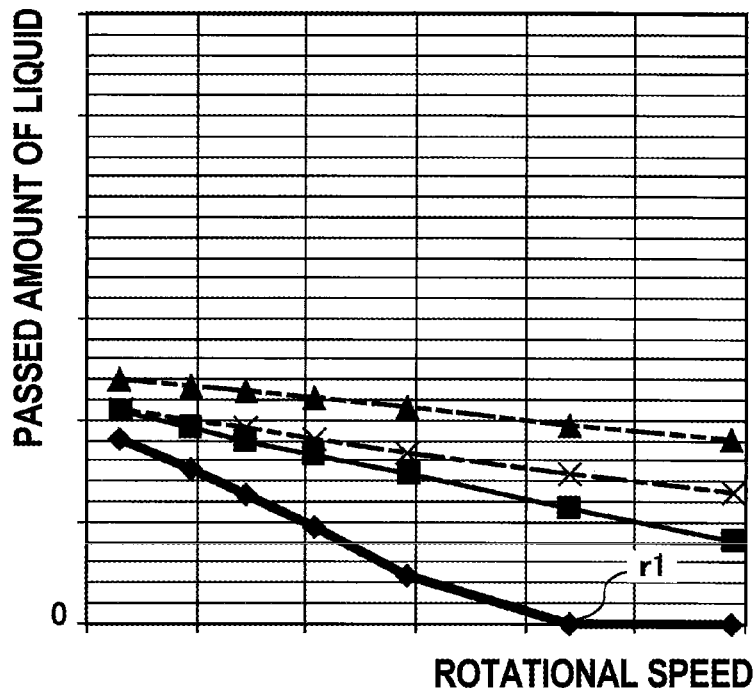
FIG. 12 is a graph showing a passed amount of water in a case where the shalt seal device is mounted on a tank that stores water having a pressure P1, and a rotational shaft is rotated.
Figure 13:
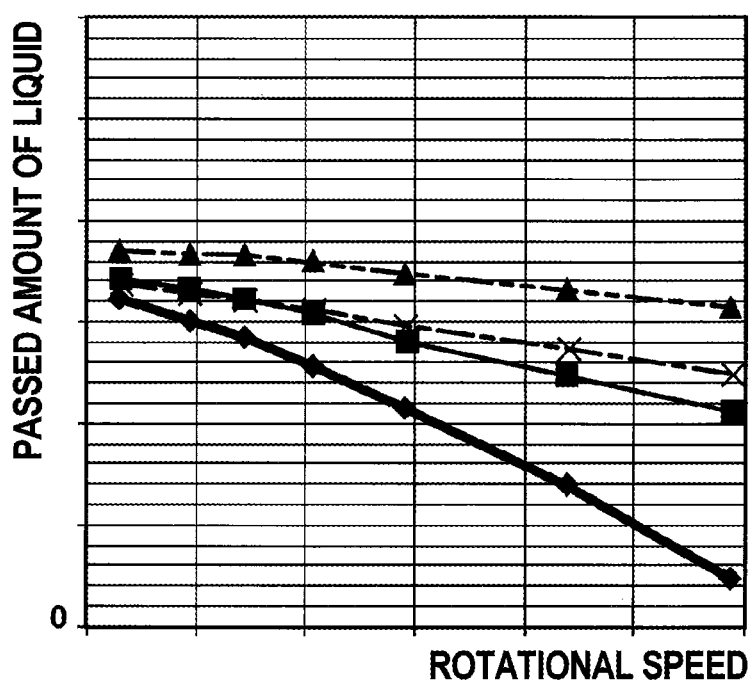
FIG. 13 is a graph showing a passed amount of water in a case where the shaft seal device is mounted on a tank that stores water having a pressure P2, and a rotational shaft is rotated.

FIG. 12 is a graph showing the passed amount of water in a case where the shaft seal device 30 is mounted on the tank that stores water having a pressure P1, and the rotational shaft 6 is rotated. FIG. 13 is a graph showing the passed amount of water in a case where the shaft seal device 30 is mounted on the tank that stores water having a pressure P2, and the rotational shaft 6 is rotated.

The pressure P1 is lower than the pressure P2 (P1<P2). In FIGS. 12 and 13, the vertical axis represents the passed amount of liquid (i.e., the amount of water discharged from the leakage liquid pipe 49), and the horizontal axis represents the rotational speed of the rotational shaft 6.

In FIGS. 12 and 13, a thin solid line represents the passed amount of liquid through the shaft seal device 30 in which the seal body 31 without the grooves 37 is attached to the rotational shaft 6, and a thick solid line represents the passed amount of liquid through the shaft seal device 30 in which the seal body 31 with the grooves 37 formed in the upper surface 31a thereof is attached to the rotational shaft 6. The grooves 37 formed in the upper surface 31a of the seal body 31 extend from the inner circumferential surface to the outer circumferential surface of the seal body 31. In FIGS. 12 and 13, a dot-and-dash line indicates the experimental result of Comparative Example 1. Specifically, the dot-and-dash line represents the passed amount of liquid through the Shaft seal device 30 in which the seal body 31 with the grooves 37 formed in the lower surface thereof is attached to the rotational shaft 6. The grooves 37, formed in the lower surface of the seal body 31, extend from the inner circumferential surface to the outer circumferential surface of the seal body 31. In FIGS. 12 and 13, a two-dot-and-dash. line indicates the experimental result of Comparative Example 2. Specifically, the two-dot-and-dash-line represents the passed amount of liquid through the shaft seal device 30 in which the seal body 31 is not attached to the rotational shaft 6. The upper seal structure 45 is a labyrinth seal having a plurality of parallel grooves formed in the upper extension-portion 35c at equal intervals, and the lower seal structure 40 is a labyrinth seal having a plurality of parallel grooves formed in the lower extension-portion 34c at equal intervals.

As shown in FIGS. 12 and 13, the passed amount of liquid through the shaft seal device 30 in which the seal body 31 is not attached to the rotational shaft 6 is larger than the passed amount of liquid through the shaft seal device 30 in which the seal body 31 without grooves 37 is attached to the rotational shaft 6, the passed amount of liquid through the shaft seal device 30 in which the seal body 31 with the grooves 37 formed in the upper surface 31a thereof is attached to the rotational shaft 6, and the passed amount of liquid through the shaft seal device 30 in which the seal body 31 with the grooves 37 formed in the lower surface thereof is attached to the rotational shaft 6. These experimental results show that the rotating seal body 31 applies centrifugal forces tending to push back the liquid flowing on the upper surface 31a of the seal body 31 radially outwardly of the seal body 31, thereby reducing the passed amount of liquid. Furthermore, the passed amount of liquid through the shaft seal devices 30 in which the seal body 31 has the grooves 37 formed in the upper surface 31a thereof is smaller than the passed amount of liquid through the shaft seal devices 30 in which the seal body 31 has no grooves 37 formed in the upper surface 31a thereof. Therefore, it can be seen that with the grooves 37 formed in the upper surface 31a of the seal body 31, the rotating seal body 31 increases centrifugal forces acting on the liquid flowing on the upper surface 31a of the seal body 31, thereby reducing the passed amount of liquid.

In FIGS. 12 and 13, the passed amount of liquid through the shaft seal device 30 in which the seal body 31 has the grooves 37 formed in the upper surface 31a thereof is smaller than the passed amount of liquid through the shaft seal device 30 in which the seal body 31 has the grooves 37 formed in the lower surface thereof. In this manner, the seal body 31 with the grooves 37 formed in the upper surface 31a thereof is able to make the passed amount of liquid smaller than the seal body 31 with the grooves 37 formed in the lower surface thereof.

As the rotational speed of the rotational shaft 6 increases, the passed amount of liquid decreases. The reason of this is that the rotating seal body 31 increases centrifugal forces acting on the liquid flowing on the upper surface 31a of the seal body 31. In particular, the shaft seal device 30 in which the seal body 31 has the grooves 37 formed in the, upper surface 31a thereof has a large decreasing ratio for the passed amount of liquid with respect to an increasing ratio for the rotational speed of the rotational shaft 6. Therefore, by attaching the seal body 31 (particularly, the seal body 31 with the grooves 37 formed in the upper surface 31a thereof) to the rotational shall 6, the passed amount of liquid can be reduced when the rotational shaft 6 rotates at high speeds. Further, referring to FIG. 12, it can be seen that the passed amount of liquid through the shaft seal device 30 in which the seal body 31 has the grooves 37 formed in the upper surface 31a thereof is 0 when the rotational speed of the rotational shaft 6 is r1 or higher. Specifically, the shaft seal device 30 in which the seal body 31 has the grooves 37 formed in the upper surface 31a thereof can prevent the liquid from passing through the upper seal structure 45 when the rotational speed of the rotational shaft 6 is r1 or higher. In this manner, the passed amount of liquid can be reduced to 0 by appropriately designing the shapes and dimensions of the seal body 31 depending on operating conditions of the pump, such as the rotational speed of the rotational shaft 6.

It can be seen from a comparison between FIGS. 12 and 13 that, when the pressure of water stored in the tank increases, the passed amount of water increases. The pressure of water stored in the tank corresponds to the pressure of the liquid flowing in the discharge elbow 4 (see FIG. 1). As described above, the amount of liquid that passes through the upper seal structure 45 (i.e., the passed amount of liquid) can be regulated by appropriately designing the shapes and dimensions of the seal body 31, the configurations of the upper seal structure 45, and the configurations of the lower seal structure 40. Alternatively, it is possible to prevent the liquid from passing through the upper seal structure 45 the passed amount of liquid=0) by appropriately designing the shapes and dimensions of the seal body 31, the configurations of the upper seal structure 45, and the configurations of the lower seal structure 40.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims and equivalents.

INDUSTRIAL APPLICABILITY

The present invention can be used as a shaft seal device that prevents a liquid from leaking out of a shalt-penetrated portion of a container through which a rotational shaft extends. The present invention can also be used as a vertical pump having this shaft seal device.

REFERENCE SIGNS LIST

1 impeller casing
2 pump casing
3 column pipe
4 discharge elbow
5 suction sump
6 rotational shaft
10 impeller
11 outer bearing
12 submerged bearing
15 intermediate bearing
20 discharge pipe
22 pump installation floor
23 installation base
25 gate valve
30 shaft seal device
31 seal body
33 seal casing
34 lower casing
35 upper casing
36 intermediate casing
37 groove
40 lower seal structure
41 sleeve
43 drain pipe
45 upper seal structure
48 leakage liquid cover
49 leakage liquid pipe
50 water eddy plate
100 discharge sump

What is claimed is:

1. A shaft seal device to be fixed to a container that separates a high-pressure fluid and a low-pressure fluid from each other and sealing a shaft-penetrated portion of the container through which a rotational shaft extends, comprising:

a seal casing having a through-hole through which the rotational shaft extends, the seal casing having a seal chamber which communicates with the through-hole and into which the high-pressure fluid flows; and a disk-shaped seal body which is housed in the seal chamber, the seal body being rotatable together with the rotational shaft and having an annular surface perpendicular to an axis of the rotational shaft;

wherein the seal casing has an upper casing and a lower casing which have the through-hole respectively, and an intermediate casing which is sandwiched between the upper casing and the lower casing;

the seal chamber is defined by a lower surface of the upper casing, an inner circumferential surface of the intermediate casing, and an upper surface of the lower casing;

the lower surface of the upper casing, which faces the annular surface of the seal body and defines the seal chamber, is a flat surface perpendicular to the axis of the rotational shaft;

a non-contact type lower seal structure which seals a gap between the rotational shaft and the through-hole of the lower casing, is disposed below the seal body;

the lower seal structure is a labyrinth seal or a flat seal;

the intermediate casing of the seal casing has at least one opening which provides a fluid communication between the seal chamber and an exterior of the seal casing; and a drain pipe, which is in communication with atmosphere, is coupled to the opening.

2. The shaft seal device according to claim 1, wherein the annular surface of the seal body has a plurality of radially-extending grooves formed therein, and each of the grooves has a width which is constant from an inner end to an outer end of the groove.

3. The shaft seal device according to claim 1, wherein the annular surface of the seal body has a plurality of radially-extending grooves formed therein, and each of the grooves has a width which gradually increases toward an outer end of the groove.

4. The shaft seal device according to claim 1, further comprising a non-contact type upper seal structure which seals a gap between the rotational shaft and the through-hole, the upper seal structure being disposed above the seal body.

5. The shaft seal device according to claim 4, wherein: the upper seal structure is a labyrinth seal or a flat seal;

a leakage liquid cover is fixed to an upper portion of the seal casing so as to surround the upper seal structure;

the leakage liquid cover has an opening which provides a fluid communication between an inner space of the leakage liquid cover and an exterior of the leakage liquid cover; and a leakage liquid pipe is coupled to the opening.

6. A shaft seal device to be fixed to a container that separates a high-pressure fluid and a low-pressure fluid from each other, and sealing a shaft-penetrated portion of the container through which a rotational shaft extends, comprising:

a seal casing having a through-hole through which the rotational shaft extends, the seal casing having a seal chamber which communicates with the through-hole and into which the high-pressure fluid flows; and a disk-shaped seal body which is housed in the seal chamber and is rotatable together with the rotational shaft;

wherein the seal casing has an upper casing and a lower casing which have the through-hole respectively, and an intermediate casing which is sandwiched between the upper casing and the lower casing;

the seal chamber is defined by a lower surface of the upper casing, an inner circumferential surface of the intermediate casing, and an upper surface of the lower casing;

the seal body has an upper surface inclined downwardly with respect to a plane perpendicular to an axis of the rotational shaft;

the lower surface of the upper casing, which faces the upper surface of the seal body and defines the seal chamber, extends along the upper surface of the seal body;

a non-contact type lower seal structure which seals a gap between the rotational shaft and the through-hole of the lower casing, is disposed below the seal body;

the lower seal structure is a labyrinth seal or a flat seal;

the intermediate casing of the seal casing has at least one opening which provides a fluid communication between the seal chamber and an exterior of the seal casing; and a drain pipe, which is in communication with atmosphere, is coupled to the opening.

7. The shaft seal device according to claim 6, wherein the upper surface of the seal body is curved.

8. A vertical pump comprising:

an impeller;

a rotational shaft to which the impeller is fixed;

a pump casing housing the impeller therein and having a shaft-penetrated portion through which the rotational shaft extends; and a shaft seal device for sealing the shaft-penetrated portion;

wherein the shaft seal device includes:

a seal casing having a through-hole through which the rotational shaft extends, the seal casing having a seal chamber which communicates with the through-hole; and a disk-shaped seal body which is housed in the seal chamber, the seal body being rotatable together with the rotational shaft and having an annular surface perpendicular to an axis of the rotational shaft;

wherein the seal casing has an upper casing and a lower casing which have the through-hole respectively, and an intermediate casing which is sandwiched between the upper casing and the lower casing;

the seal chamber is defined by a lower surface of the upper casing, an inner circumferential surface of the intermediate casing, and an upper surface of the lower casing;

the lower surface of the upper casing, which faces the annular surface of the seal body and defines the seal chamber, is a flat surface perpendicular to the axis of the rotational shaft;

a non-contact type lower seal structure which seals a gap between the rotational shaft and the through-hole of the lower casing, is disposed below the seal body;

the lower seal structure is a labyrinth seal or a flat seal;

the intermediate casing of the seal casing has at least one opening which provides a fluid communication between the seal chamber and an exterior of the seal casing; and a drain pipe, which is in communication with atmosphere, is coupled to the opening.

9. A vertical pump comprising:

an impeller;

a rotational shaft to which the impeller is fixed;

a pump casing housing the impeller therein and having a shaft-penetrated portion through which the rotational shaft extends; and a shaft seal device for sealing the shaft-penetrated portion;

wherein the shaft seal device includes:

a seal casing having a through-hole through which the rotational shaft extends, the seal casing having a seal chamber which communicates with the through-hole; and a disk-shaped seal body which is housed in the seal chamber and is rotatable together with the rotational shaft;

wherein the seal casing has an upper casing and a lower casing which have the through-hole respectively, and an intermediate casing which is sandwiched between the upper casing and the lower casing;

the seal chamber is defined by a lower surface of the upper casing, an inner circumferential surface of the intermediate casing, and an upper surface of the lower casing;

the seal body has an upper surface inclined downwardly with respect to a plane perpendicular to an axis of the rotational shaft;

the lower surface of the upper casing, which faces the upper surface of the seal body and defines the seal chamber, extends along the upper surface of the seal body;

a non-contact type lower seal structure which seals a gap between the rotational shaft and the through-hole of the lower casing, is disposed below the seal body;

the lower seal structure is a labyrinth seal or a flat seal;

the intermediate casing of the seal casing has at least one opening which provides a fluid communication between the seal chamber and an exterior of the seal casing; and a drain pipe, which is in communication with atmosphere, is coupled to the opening.

* * * * *